US011986869B2

(12) United States Patent
Ho et al.

(10) Patent No.: US 11,986,869 B2
(45) Date of Patent: May 21, 2024

(54) METHOD OF CLEANING, SUPPORT, AND CLEANING APPARATUS

(71) Applicant: TAIWAN SEMICONDUCTOR MANUFACTURING COMPANY, LTD., Hsinchu (TW)

(72) Inventors: Yi Chen Ho, Taichung (TW); Chih Ping Liao, Hsinchu (TW); Ker-hsun Liao, Hsinchu (TW); Chi-Hsun Lin, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/833,814

(22) Filed: Jun. 6, 2022

(65) Prior Publication Data

US 2023/0390813 A1 Dec. 7, 2023

(51) Int. Cl.
*B08B 9/032* (2006.01)
*B08B 13/00* (2006.01)

(52) U.S. Cl.
CPC ............ *B08B 9/0321* (2013.01); *B08B 13/00* (2013.01); *B08B 2209/032* (2013.01)

(58) Field of Classification Search
CPC . B08B 9/0321; B08B 13/00; B08B 2209/032; B05B 13/02; B05B 15/60; B05B 13/0278; B05B 15/62
See application file for complete search history.

(56) References Cited

U.S. PATENT DOCUMENTS

| | | | | |
|---|---|---|---|---|
| 8,298,341 | B2 * | 10/2012 | Katoh | C03C 23/0075 134/28 |
| 2002/0066475 | A1 * | 6/2002 | Verhaverbeke | B25B 5/06 134/902 |
| 2003/0102015 | A1 * | 6/2003 | Halbmaier | B08B 9/093 134/171 |
| 2005/0274396 | A1 * | 12/2005 | Shih | H01J 37/32862 134/28 |
| 2011/0146909 | A1 * | 6/2011 | Shih | H01J 37/32862 156/345.35 |
| 2013/0167774 | A1 * | 7/2013 | Yang | C23C 16/45587 118/728 |
| 2015/0376781 | A1 * | 12/2015 | Kogura | C23C 16/45523 438/758 |
| 2019/0368036 | A1 * | 12/2019 | Kuribayashi | C23C 16/52 |

* cited by examiner

*Primary Examiner* — Sharidan Carrillo
(74) *Attorney, Agent, or Firm* — STUDEBAKER & BRACKETT PC

(57) ABSTRACT

A method of cleaning includes placing a semiconductor device manufacturing tool component made of quartz on a support. A cleaning fluid inlet line is attached to a first open-ended tubular quartz projection extending from an outer main surface of the semiconductor device manufacturing tool component. A cleaning fluid is applied to the semiconductor device manufacturing tool component by introducing the cleaning fluid through the cleaning fluid inlet line and the tubular quartz projection.

19 Claims, 24 Drawing Sheets

METHOD OF CLEANING, SUPPORT, AND CLEANING APPARATUS

BACKGROUND

In semiconductor device manufacturing operations, it is important to keep semiconductor device manufacturing tools clean and to limit contamination inside the tool. Contaminants inside the tool may fall on the semiconductor device being produced. Such fall-on particles can block or interfere with subsequent photolithographic, etching, and deposition operations leading to pattern defects. For example, a quartz tube furnace used in a deposition operation, such as atomic layer deposition (ALD) of a silicon nitride layer, may form a coating of silicon nitride and other reaction byproducts on a surface of the quartz. Particles of the silicon nitride and other reaction byproducts may fall off the quartz furnace side wall during furnace operation or during workpiece transfer and contaminate the device workpiece being processed. Defects formed by the contaminant particles directly affect wafer acceptance testing (WAT) results and reduce device yield and performance.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

It is to be understood that the following disclosure provides many different embodiments, or examples, for implementing different features of the disclosure. Specific embodiments or examples of components and arrangements are described below to simplify the present disclosure. These are, of course, merely examples and are not intended to be limiting. For example, dimensions of elements are not limited to the disclosed range or values, but may depend upon process conditions and/or desired properties of the device. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for simplicity and clarity.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly. In addition, the term "made of" may mean either "comprising" or "consisting of."

Quartz tube furnaces are used in a number of deposition operations during semiconductor device manufacturing. The material being deposited and byproducts of the deposition operation may also coat the walls of the quartz tube furnace. Particles of the quartz tube wall coatings may fall off the quartz tube wall during semiconductor device processing and the particles may contaminate the semiconductor device workpiece. Therefore, it is desirable to prevent particulate contaminants from falling off the quartz tube walls during semiconductor device manufacturing. Embodiments of the present disclosure are directed to a cleaning apparatus for cleaning tube furnace components and economical methods of cleaning tube furnace components rather than replacing dirty tube furnace components with new components.

Figure 1:
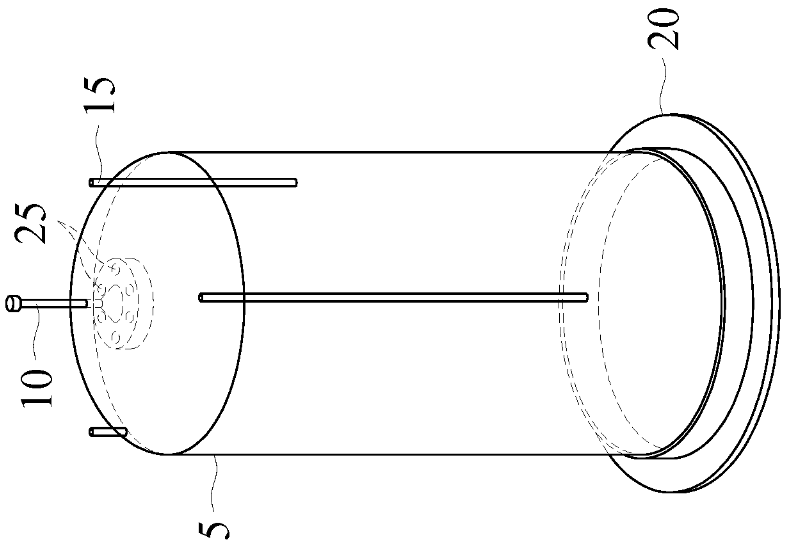
FIG. 1 shows a tube of a tube furnace according to some embodiments of the present disclosure.

FIG. 1 shows a tube 5 of a tube furnace according to some embodiments of the present disclosure. The tube 5 is made of quartz in some embodiments. The tube 5 is substantially cylindrical-shaped and is open at one end and substantially closed at the other end. In some embodiments, the tube has a diameter of about 100 mm to about 400 mm. The closed end includes a projection 10 extending from the closed end in the axial direction. During a deposition operation, such as an atomic layer deposition (ALD) of a silicon nitride layer on the semiconductor device workpieces, the projection 10 is a gas outlet. In some embodiments, the projection 10 is used to introduce the cleaning fluid into the tube 5 during a cleaning operation. The tube 5 further includes one or more additional tubular quartz projections 15 in some embodiments. The additional tubular quartz projections 15 are inlets for sensors, such as temperature sensors, in some embodiments. In other embodiments, the additional tubular quartz projections 15 are used to introduce other deposition gases or inert gases into the tube furnace. In some embodiments, the tube 5 includes a flange 20 at its open end. In some embodiments, the flange 20 is a ground glass flange. The tube 5 may include one or more openings 25 surrounding the projection 10. The openings 25 may be vents. Alternatively, in a cleaning operation, cleaning fluid is introduced into the quartz tube 5 through the projection 10, the cleaning fluid subsequently fills the tube, and exits the tube through the one or more openings 25.

Figure 2:
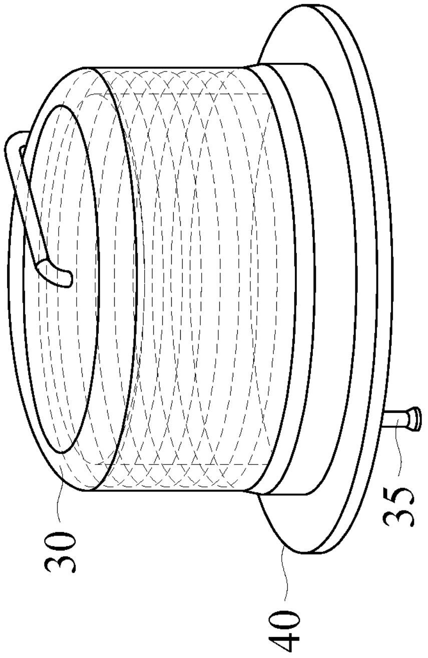
FIG. 2 shows an end cap of a tube furnace according to some embodiments of the present disclosure.

FIG. 2 shows an end cap 30 of a tube furnace according to some embodiments of the present disclosure. In some embodiments, the end cap 30 includes a tubular projection 35 extending past the bottom surface of the end cap 30 in a downwards direction as shown in FIG. 2. During operation of the tube furnace, the deposition material is introduced into the tube furnace through the tubular projection 35. In some embodiments, the cleaning fluid is applied to the end cap through the end cap tubular projection 35. In some embodiments, the end cap 30 includes a flange 40 and the tubular projection 35 extends downward past the flange 40 as shown in FIG. 2. In some embodiments, the end cap 30 is attached to the tube 5 at the bottom of the tube during tube furnace operation. In some embodiments, the flange 40 is a ground glass flange, and the end cap flange 40 is in contact with the ground glass tube flange 20 during operation of the tube furnace.

Figure 3:
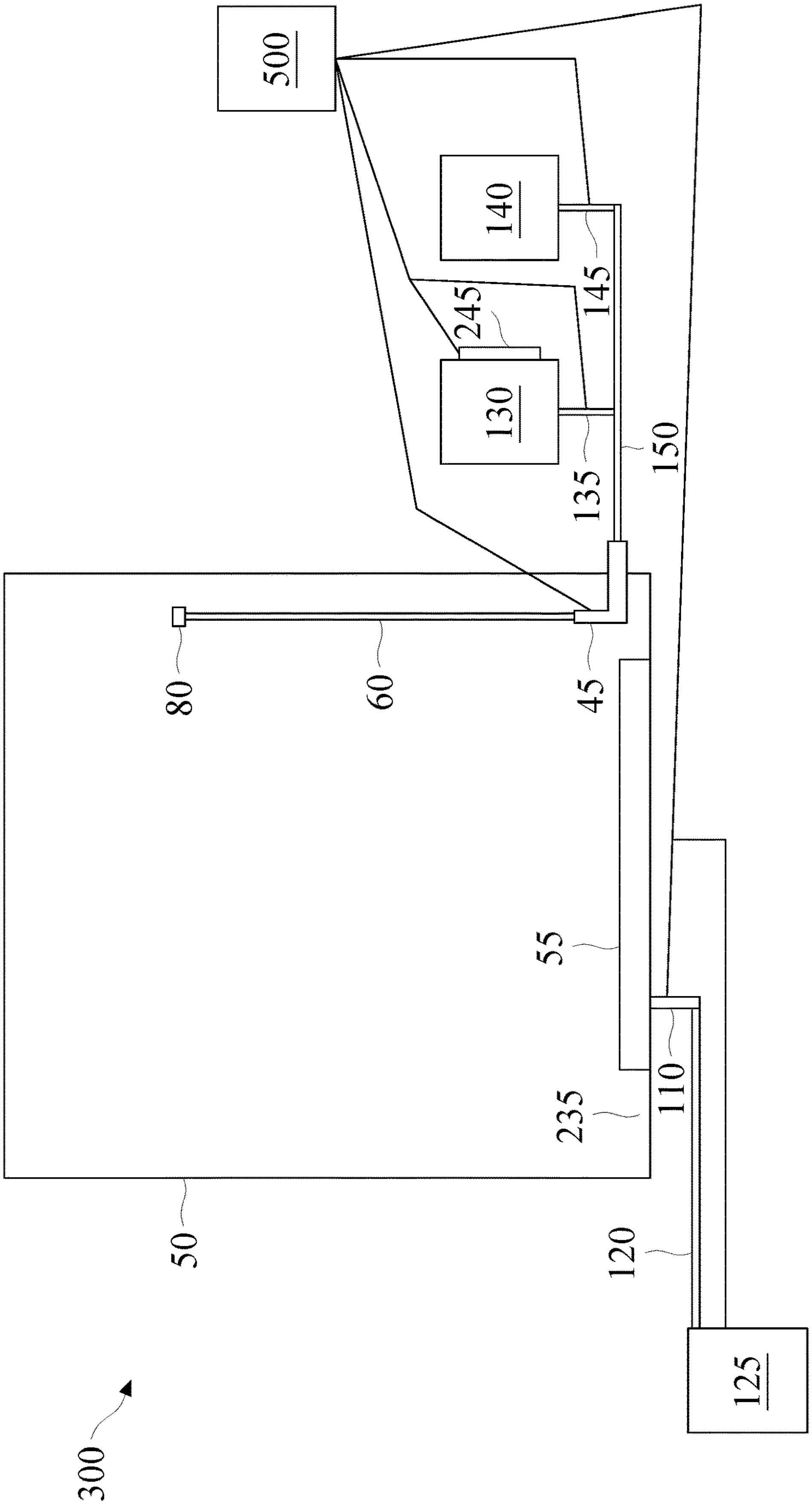
FIG. 3 shows a schematic view of a cleaning apparatus according to some embodiments of the present disclosure.

FIG. 3 shows a schematic view of a cleaning apparatus 300 according to some embodiments of the present disclosure. The cleaning apparatus 300 includes an enclosure 50. In some embodiments, the enclosure 50 is chemically resistant to the cleaning fluid. In some embodiments, the enclosure 50 is made of a clear or translucent polymeric material. In some embodiments, the enclosure 50 includes a door (not shown) configured to provide entry and removal of the tube furnace components. A support 55 is included on the base 235 of the enclosure 50 to support the tube furnace component that is being cleaned. The enclosure further includes a cleaning fluid inlet 45. An internal cleaning fluid line 60 is attached to the inlet 45. The internal cleaning fluid line 60 has a fluid line fitting 80 at its end.

In some embodiments, a cleaning fluid reservoir or tank 130 stores cleaning fluid to be used to clean the tube furnace. A rinse fluid reservoir or tank 140 stores rinse fluid, such as deionized water in some embodiments. The cleaning fluid reservoir or tank 130 and the rinse fluid reservoir or tank 140 are connected to an external fluid line 150 by a cleaning fluid line 135 and a rinse fluid line 145, respectively. In some embodiments, a heater 245 heats the cleaning fluid to an elevated temperature to improve cleaning efficiency. In some embodiments, the heater 245 heats the cleaning fluid to a temperature ranging from about 35° C. to about 100° C. In some embodiments, the cleaning fluid is recovered in a cleaning fluid recovery reservoir or tank 125 after cleaning the tube furnace component. The used cleaning fluid may be filtered, treated, recycled, and reused. The used cleaning fluid passes through drains or outlets 110 in the base 235 of the enclosure, and is routed to the cleaning fluid reservoir or tank 125 through a cleaning fluid drain line 120 in some embodiments.

The cleaning operation is monitored and controlled by a controller 500 in some embodiments. In some embodiments, the controller 500 monitors or controls any or all of the flow of cleaning fluid or rinse fluid. The flow of the cleaning fluid or rinse fluid may be controlled by the controller 500 actuating valves (not shown) in the fluid flow lines. In some embodiments, the controller 500 monitors the temperature of the cleaning fluid and controls the heater 245. In some embodiments, the controller 500 controls the flow of the fluid draining through the outlet or drains 110, and monitors the level of recovered fluid in the recovery reservoir or tank 125.

In some embodiments, all components of the cleaning apparatus that contact the cleaning fluid are made of materials that are chemically resistant to the cleaning fluid. In some embodiments, the cleaning fluid is an aqueous solution. In some embodiments, the cleaning fluid is an aqueous HF solution. In some embodiments the fluid lines 60, 110, 120, 135, are made of a fluoropolymer, such as a perfluoroalkoxy alkane, or a polyolefin, such as polyethylene or polypropylene. In some embodiments, the fluid lines 60, 110, 120, is a perfluoroalkoxy alkane (PFA) bellows tube.

In some embodiments, the enclosure 50, the enclosure base 235, support 55, inlet 45, outlet/drains 110, and reservoirs/tanks 125, 130, 140 are made of polymeric or metallic materials chemically resistant or inert to the cleaning fluids. In some embodiments, these components are made of polyethylene (PE), polypropylene (PP), polytetrafluoroethylene (PTFE), polyvinylidene fluoride (PVDF), polyphenylene oxide (PPO), polyethylene terephthalate (PET), polyvinyl chloride (PVC), hastelloy, or stainless steel.

In some embodiments, the cleaning operation of quartz tube furnace components includes a pre-rinse of the tube furnace components for about 5 to about 10 minutes. In some embodiments the tube furnace components are pre-rinsed with deionized water. After the pre-rinse alternating cycles of applying cleaning fluid and rinsing are performed. In some embodiments, the cleaning fluid is a 5% HF aqueous solution. In some embodiments, the 5% HF aqueous solution is applied for about 5 to about 10 minutes, the HF solution is drained, and then deionized water rinse is performed, and the deionized water is subsequently drained, and the cycle is repeated. In some embodiments, the cleaning, draining, rinsing, draining cycle is repeated 5 or more times, though the cycle can be repeated fewer than 5 times. After the final rinse cycle, the cleaned quartz tube furnace component is continuously flushed with deionized water for 24 hours or more and then dried in some embodiments.

Figure 4B:
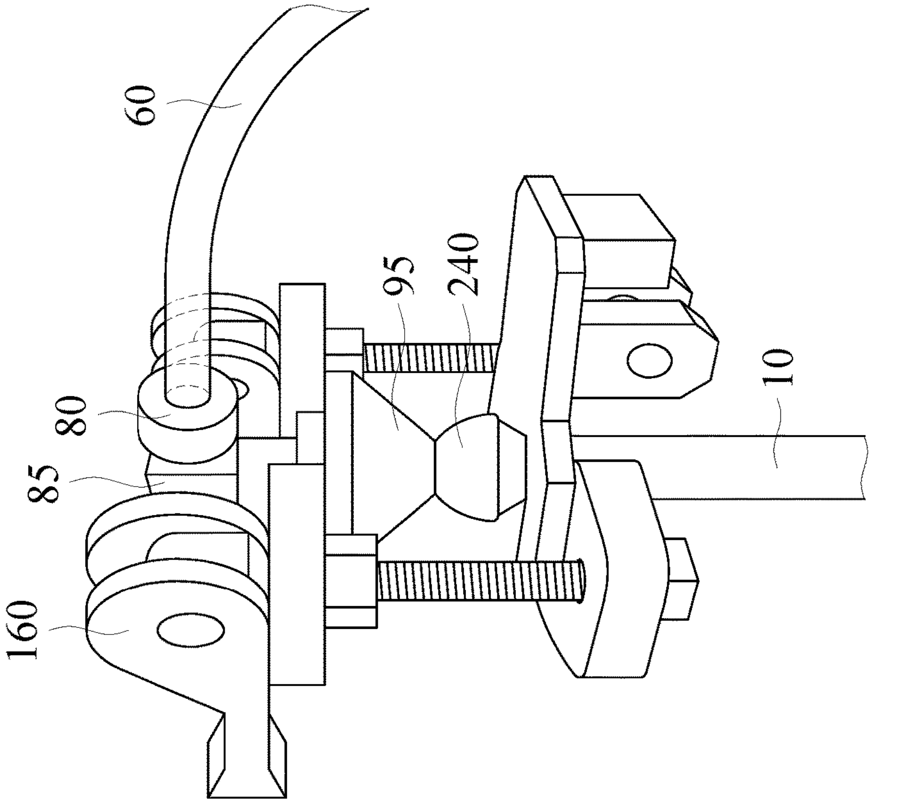
FIGS. 4B, 4C, 4D, 4E, 4F, and 4G show details of the cleaning apparatus of FIG. 4A.
Figure 4A:
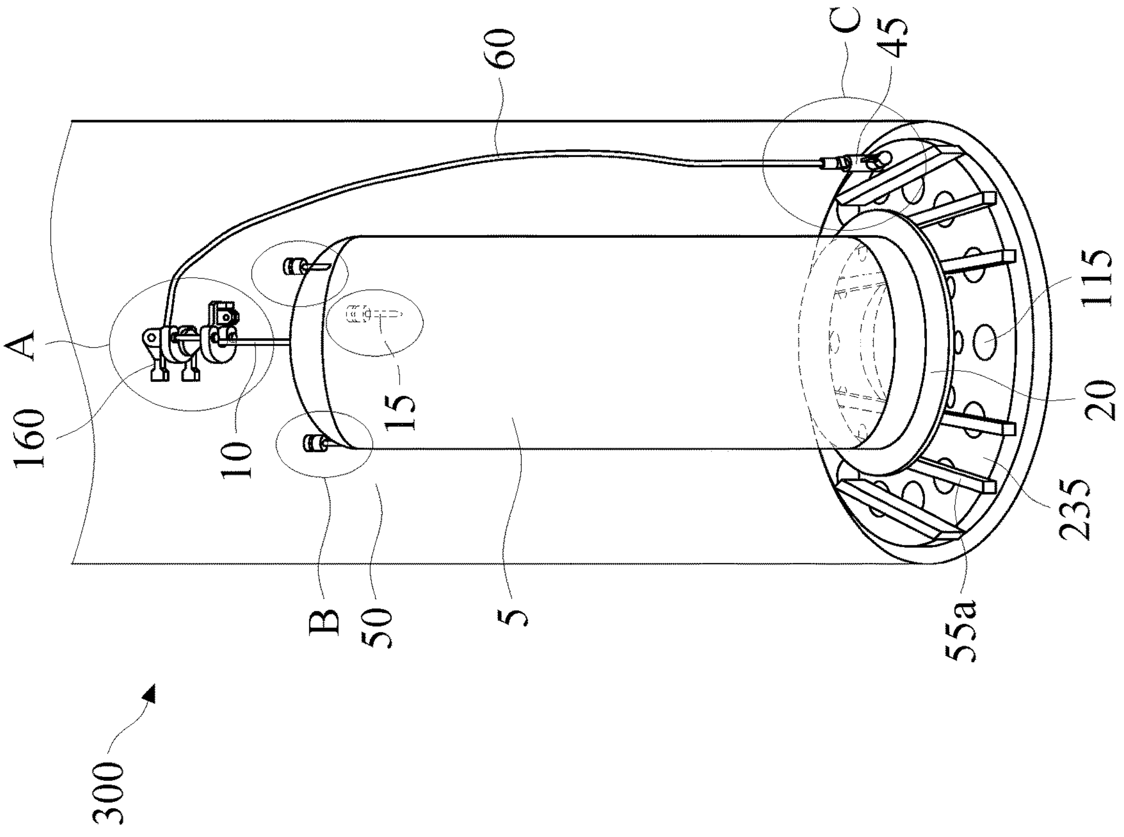
FIG. 4A shows a cleaning apparatus according to some embodiments of the present disclosure.

FIG. 4A shows a cleaning apparatus 300 according to some embodiments of the present disclosure, and FIGS. 4B-4G show details of the cleaning apparatus 300 of FIG. 4A. As shown in FIG. 4A, in some embodiments, a quartz furnace tube 5 is placed in a clear enclosure 50. The tube 5 is placed on one or more supports 55 on the base 235 of the enclosure 50. In some embodiments, the supports 55 include a plurality of ribs **55*a*. In some embodiments, the ribs 55*a* are made of a fluoropolymer, such as PTFE. The enclosure base 235 includes a plurality of drains 115 to allow cleaning fluid to be removed from the enclosure 50 in some embodiments. The cleaning fluid enters the enclosure through an inlet 45 and flows through an internal fluid line 60 to tube 5**.

Figure 4C:
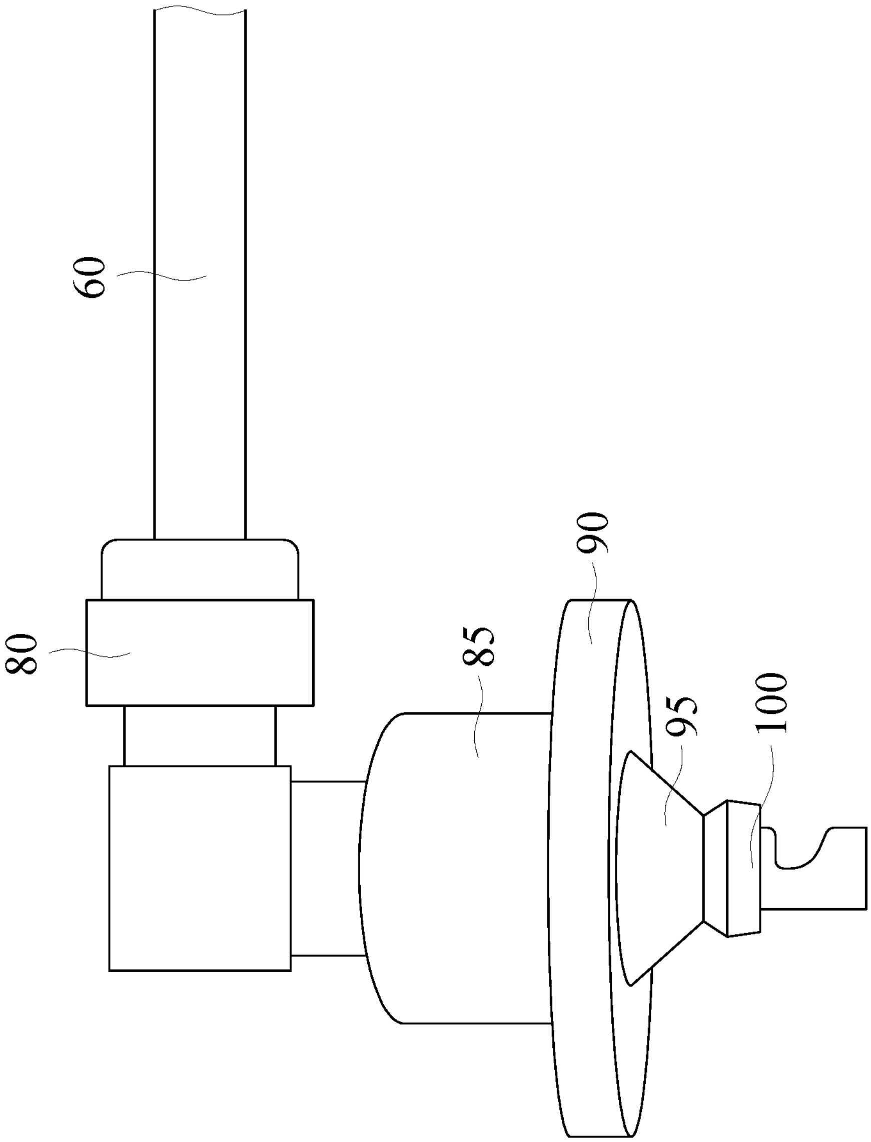

FIG. 4B is a detailed view of detail A of FIG. 4A showing the arrangement of the cleaning fluid inlet line 60 and the tubular projection 10. The projection 10 may include a ground glass ball joint 240 at its end. In some embodiments, the cleaning fluid inlet line 60 is attached to a top projection adapter 85 by a threaded fitting 80. The top projection adapter 85 includes a tapered portion 95 that mates with an opening at the end of the ground glass ball joint 240 in some embodiments. In some embodiments, a quick release clamp assembly 160 urges the top projection adapter 85 to the ground glass ball joint 240 to firmly attach the top projection adapter 85 to the projection 10. FIG. 4C is a detailed view of the top projection adapter 85/cleaning fluid inlet line 60 assembly in some embodiments. As shown, in some embodiments, the top projection adapter 85 includes a flange 90 and a cleaning fluid delivery outlet 100. In some embodiments, the cleaning fluid delivery outlet 100 sprays the cleaning fluid into the tube 5. The clamp assembly 160 attaches to the flange 90 and urges the top projection adapter 85 into contact with the projection 10 when the clamp assembly 160 is tightened.

Figure 4E:
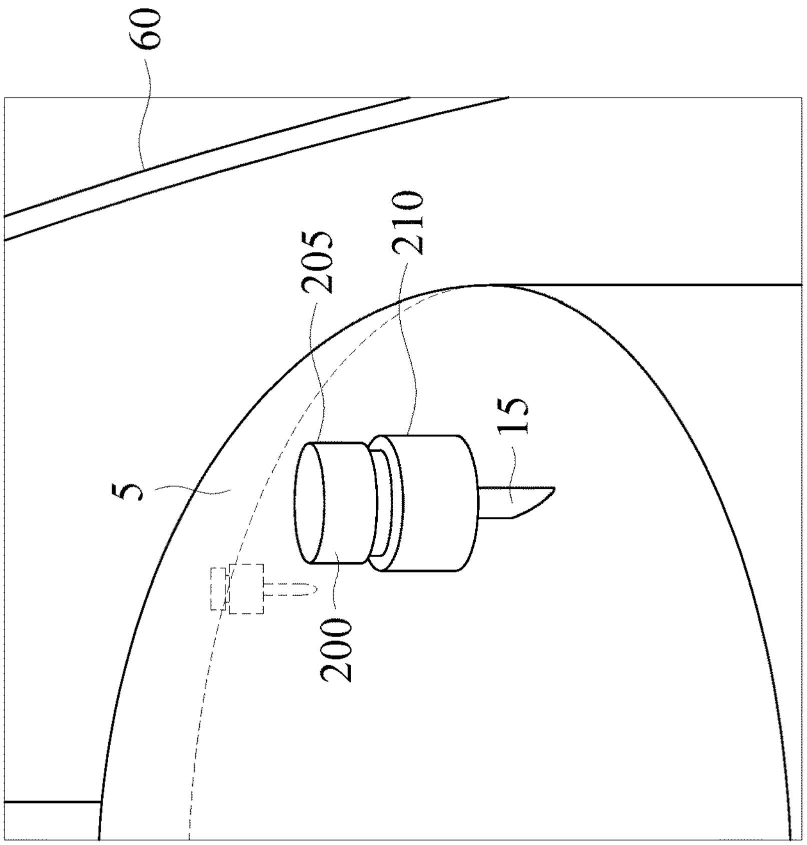
Figure 4D:
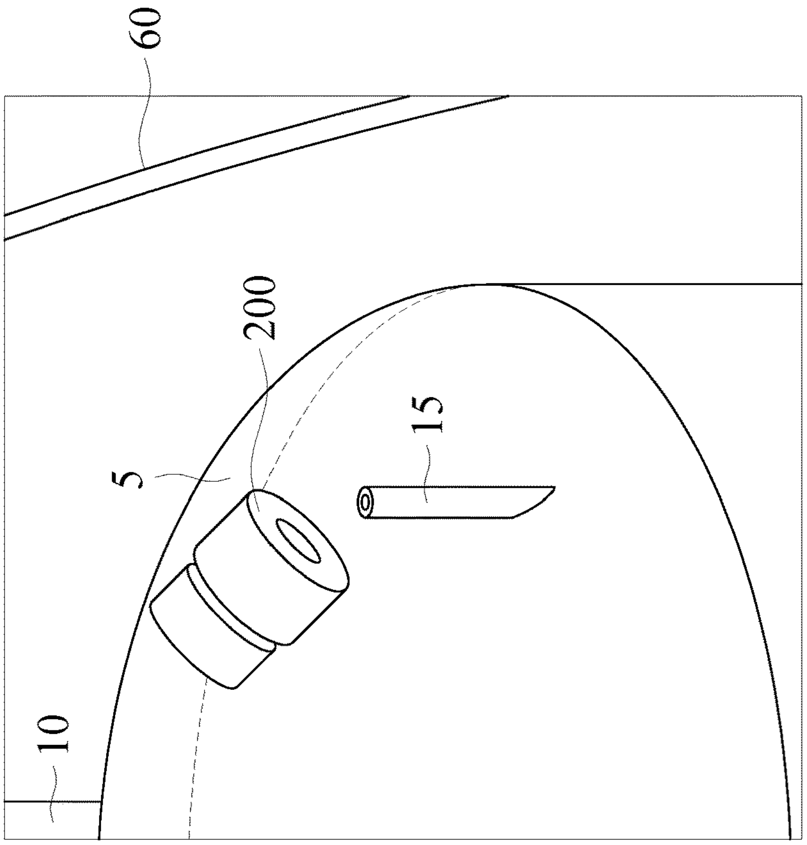
Figure 4F:
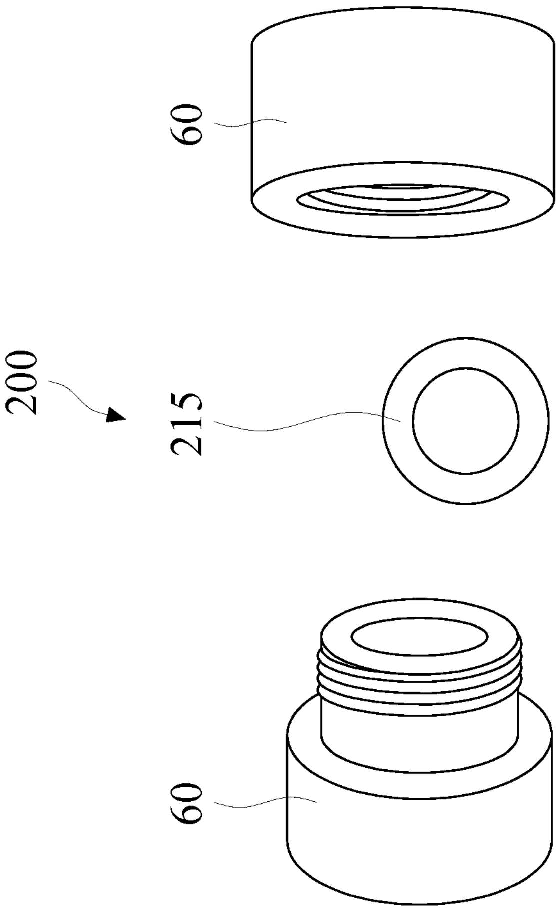

FIGS. 4D and 4E are detailed views of detail B of FIG. 4A. FIG. 4D shows a projection end cap 200 about to be placed on one of the additional projections 15. FIG. 4E shows the end cap 200 sealing the end of one of the additional projections 15. A detailed exploded view of the end cap 200 is shown in FIG. 4F. The end cap 200 includes an upper portion 205 that includes an externally threaded projection and a reciprocal lower portion 210 that includes internal threads. An O-ring 215 is disposed between the upper portion 205 and the lower portion 210. After placing the end cap 200 over the projection 15, the end cap 200 is tightened by turning the upper portion 205 relative to the lower portion 210, thereby compressing the O-ring and sealing the projection 15. In some embodiments, the outer surface of the upper 205 or lower 210 portions are knurled to facilitate tightening and loosening the end cap 200.

Figure 4G:
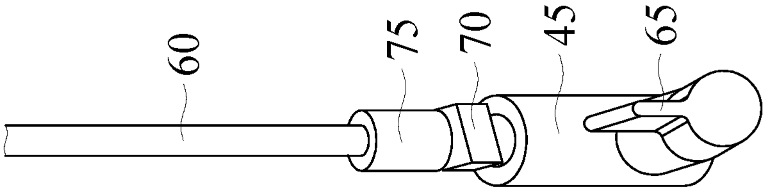

FIG. 4G is a detailed view of detail C of FIG. 4A showing the cleaning fluid inlet assembly. In some embodiments, the cleaning fluid enters the enclosure 50 through the enclosure base 235. In other embodiments, the inlet 45 is located on a sidewall of the enclosure 50. The internal cleaning fluid line 60 is connected to the cleaning fluid inlet 45 by a threaded fitting 75 on the cleaning fluid line 60 and a reciprocal threaded fitting 70 on the cleaning fluid inlet 45. The cleaning fluid inlet 45 further includes a valve 65 to turn on and shut off fluid flow. In some embodiments, the valve 65 is manually operated, in other embodiments, the valve 65 is controlled by the controller 500.

Figure 5:
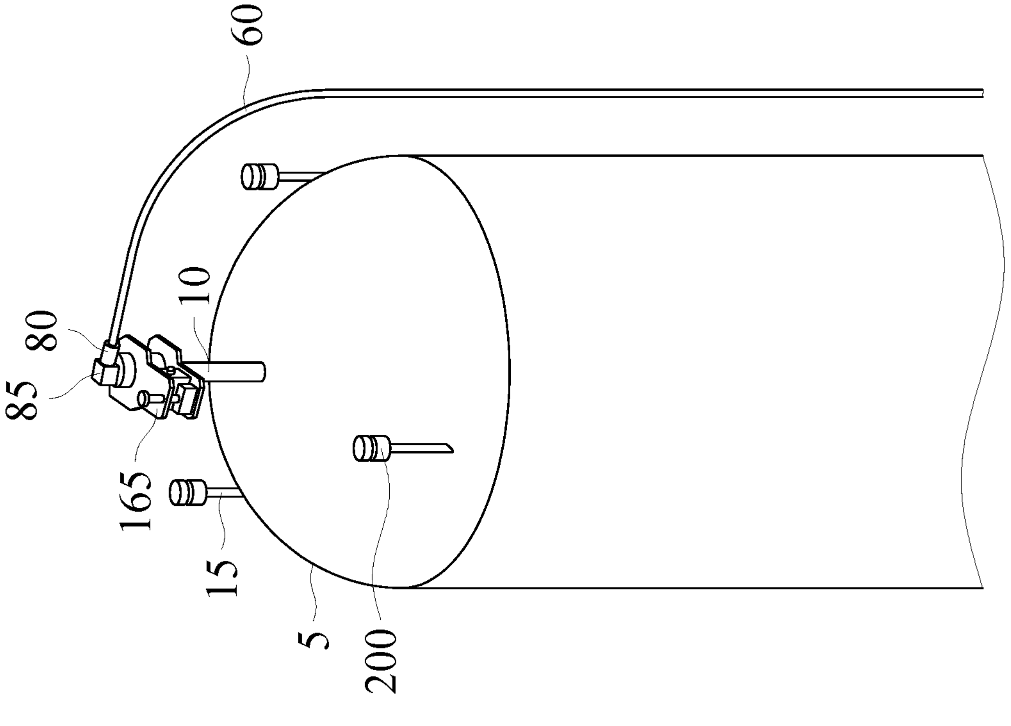
FIG. 5 shows a cleaning apparatus according to some embodiments of the present disclosure.

FIG. 5 shows an alternative embodiment of the cleaning apparatus according to some embodiments of the present disclosure. In some embodiments, a pivoting screw clamp 165 is used to securely attach the top projection adapter 85 to the gas outlet projection 10 of the tube 5.

Figure 6B:
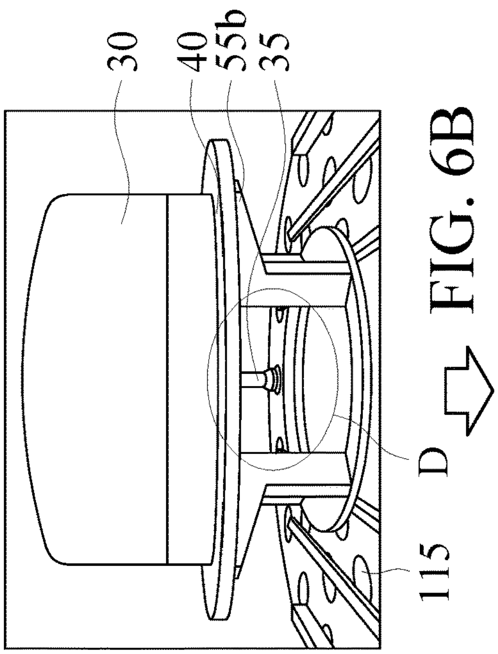
FIGS. 6A, 6B, 6C, and 6D show sequential stages of an operation of cleaning an end cap of a tube furnace according to some embodiments of the disclosure.
Figure 6A:
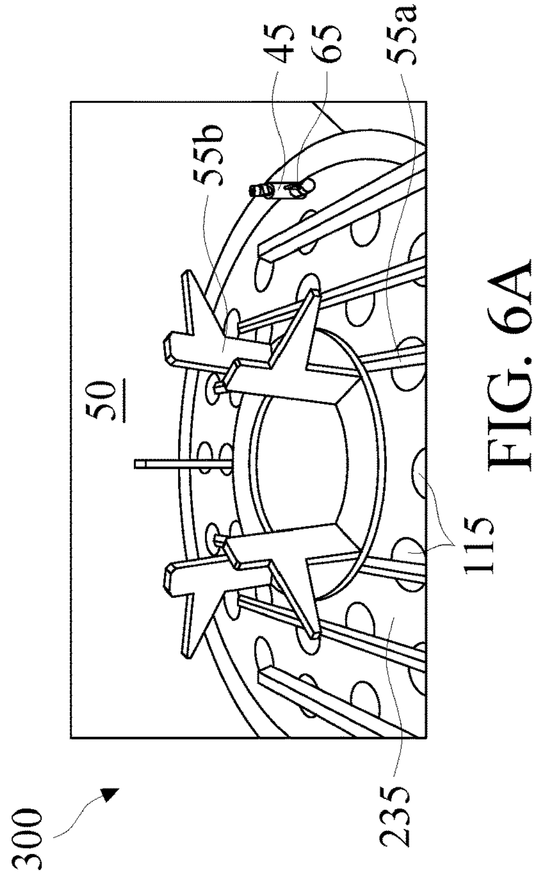

FIGS. 6A, 6B, 6C, and 6D show sequential stages of an operation of cleaning an end cap 30 of a tube furnace according to some embodiments of the disclosure. FIGS. 6E, 6F, 6G, 6H, and 6I show details of the end cap 30 being cleaned and the cleaning apparatus 300 in FIGS. 6A-6D. As shown in FIG. 6A, an end cap support 55*b* is positioned in the enclosure 50 of the cleaning apparatus 300. In some embodiments, the end cap support 55*b* is placed on the support ribs 55*a*, in other embodiments, the end cap support 55*b* is placed directly on the enclosure base 235.

Figure 6C:
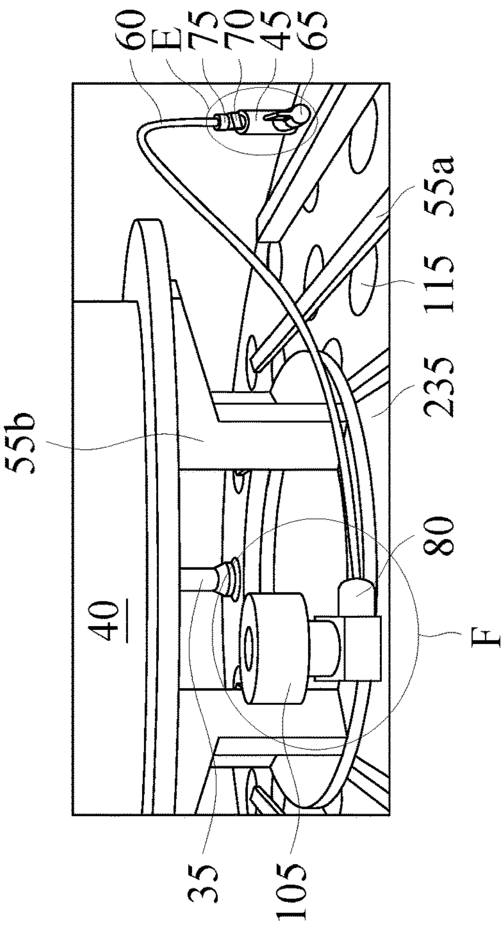

As shown in FIG. 6B, the tube furnace end cap 30 is subsequently placed over the end cap support 55*b*. The end cap support 55*b* supports the end cap 30, so that there is sufficient clearance below the end cap projection 35 extending from the bottom of the end cap 30 to enable the attachment of the internal cleaning fluid line 60 to the end cap projection 35. FIG. 6C shows a bottom projection adapter 105 that mates with the end cap projection 35 to provide cleaning fluid to the end cap 30.

After attaching the bottom projection adapter 105 to the end cap projection 35, a clamp 165 is attached to the bottom projection adapter 105 and end cap projection 35. In some embodiments, the clamp is a pivoting screw clamp 165. When the pivoting screw clamp 165 is tightened, the bottom projection adapter 105 is urged against the end cap projection 35, thereby providing a cleaning fluid flow path from the internal cleaning fluid line 60 to the end cap 30.

Figure 6D:
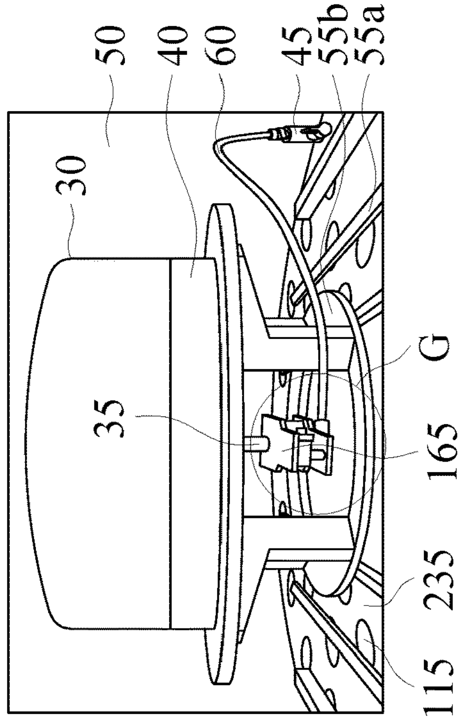
Figure 6E:
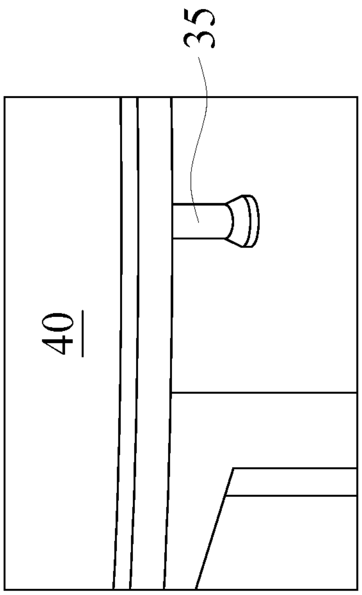
FIGS. 6E, 6F, 6G, 6H, and 6I show details of the end cap being cleaned and the cleaning apparatus in FIGS. 6A-6D.

FIG. 6E is a detailed view of detail D of FIG. 6B showing the end cap projection 35. In some embodiments, the end of the end cap projection 35 is flared. In other embodiments, there is a ground glass ball joint at the end of the end cap projection 35.

Figure 6F:
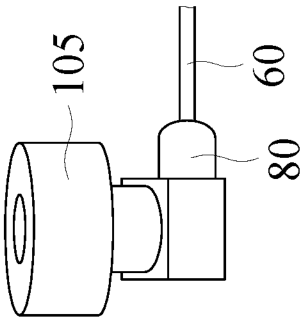

FIG. 6F is a detailed view of detail F of FIG. 6C showing the bottom projection adapter 105/internal cleaning fluid line 60 assembly. In some embodiments, the internal cleaning fluid line 60 is connected to the bottom projection adapter by threaded fittings.

Figure 6G:
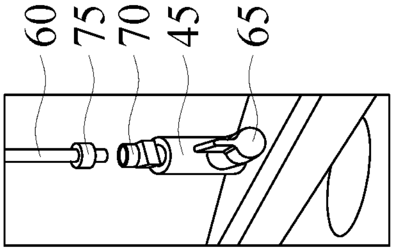
Figure 6H:
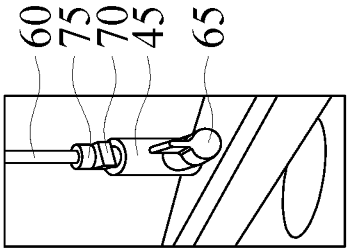

FIGS. 6G and 6H are detailed views showing the attachment of the internal cleaning fluid line 60 to the cleaning fluid inlet 45, corresponding to detail E of FIG. 6C. As shown in FIG. 6G, a fitting 75 with internal threads on the internal cleaning fluid line 60 is connected to a fitting 70 with external threads on the cleaning fluid inlet, to provide the connection shown in FIG. 6H.

Figure 6I:
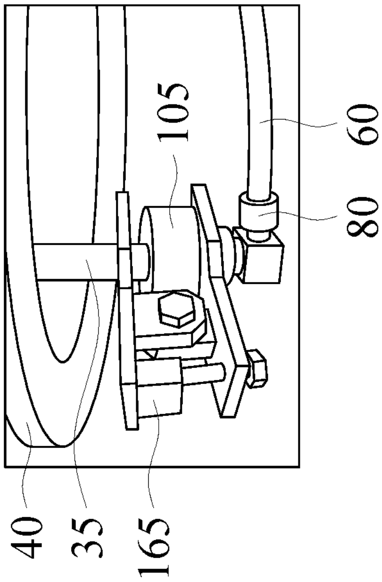

FIG. 6I is a detailed view of detail G of FIG. 6D showing the arrangement of the cleaning fluid inlet line 60 and the end cap tubular projection 35. In some embodiments, the cleaning fluid inlet line 60 is attached to the bottom projection adapter 105 by a threaded fitting 80. In some embodiments, a pivoting screw clamp 165 secures the end of the end cap tubular projection 35 in the opening of the bottom projection adapter 105. The clamp 165 attaches to an under side of stepped portion of the bottom projection adapter 105 and urges the bottom projection adapter 105 into contact with the end cap projection 35 when the clamp 165 is tightened.

Figure 7A:
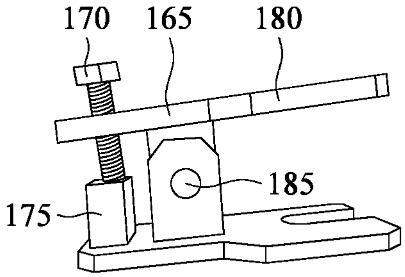
FIG. 7A shows a clamp for attaching a cleaning fluid inlet line to tube furnace component being cleaned in a cleaning apparatus according to some embodiments of present disclosure.
Figure 7B:
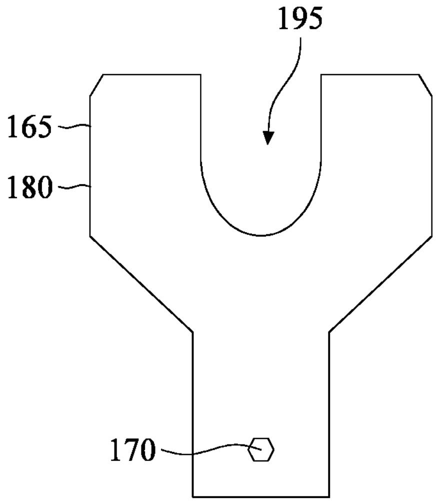
FIG. 7B is a plan view of the clamp of FIG. 7A.

FIG. 7A shows a clamp 165 for attaching the internal cleaning fluid line 60 to the projections 10, 35 on the quartz tube furnace components according to some embodiments of present disclosure. FIG. 7B is a plan view of the clamp 165 of FIG. 7A. As the screw 170 is turned, the screw 170 pushes downward on the block 175 on the lower Y-shaped plate causing the lower Y-shaped plate 180 to rotate around the axis 185 and bringing the ends of Y-shaped plates 180 having the U-shaped openings closer together, thereby tightening the connection between the adapter 85, 105 and the projections 10, 35. In some embodiments the dimensions of the U-shaped opening 195 in the Y-shaped plate 180 are the same for both opposing Y-shaped plates 180. In other embodiments, the dimensions of the U-shaped opening 195 in one plate is different than the U-shaped opening 195 in the opposing Y-shaped plate 180. In some embodiments, the dimensions of the U-shaped openings 195 are selected depending on the dimension of the components that are being connected to each other. In some embodiments, the clamp 165 is made of a polymer composition, including ultra high molecular weight polyethylene, polyetherimide, polyvinyl chloride, or any other suitable polymer composition.

Figure 8A:
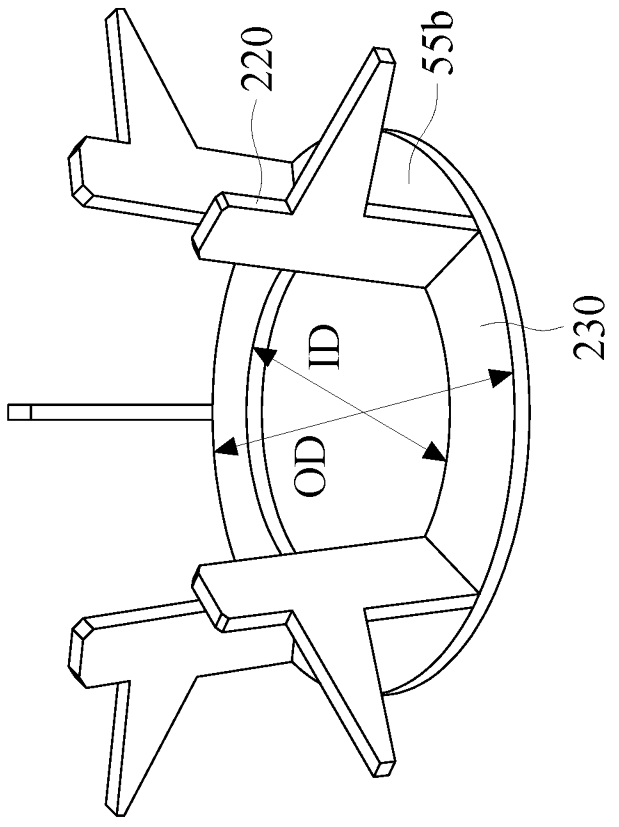
FIG. 8A shows a support for tube furnace component being cleaned in a cleaning apparatus according to some embodiments of the disclosure.
Figure 8B:
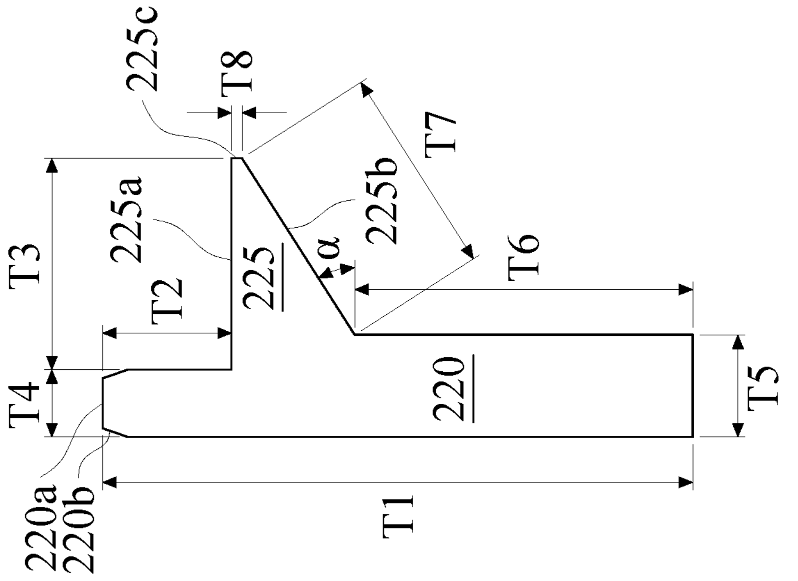
FIG. 8B is a detailed view of a vertically extending member of the support of FIG. 8A.

FIG. 8A shows a support 55*b* for a tube furnace end cap 30 being cleaned in a cleaning apparatus 300 according to some embodiments of the disclosure. FIG. 8B is a detailed view of a vertically extending member 220 of the end cap support 55*b* of FIG. 8A. The end cap support 55*b* includes an annular base 230 and a plurality of vertically extending members 220 disposed on the annular base 230. In some embodiments, at least three vertically extending members 220 are disposed on the annular base 230. In some embodiments, four, five, six or more vertically extending members 220 are disposed on the annular base 230. In some embodiments, the vertically extending members 220 are evenly arranged around the annular base 230. In other words, all the immediately adjacent vertically extending members 220 have substantially the same angular separation along the annular base 230 to within +/−5°.

In some embodiments, the end cap support 55*b* is made of a polymer composition, including ultra high molecular weight polyethylene (UEMWPE), polyetherimide (PEI), polyvinyl chloride (PVC), polypropylene (PP), polytetrafluoroethylene (PTFE), polyvinylidene fluoride (PVDF), polyphenylene oxide (PPO), polyethylene terephthalate (PET), hastelloy, any other suitable polymer composition, or stainless steel.

In some embodiments, the annular base 230 and the vertically extending member 220 have a thickness of about 0.5 cm to about 2 cm, in other embodiments, the thickness ranges from about 0.8 cm to about 1.2 cm.

In some embodiments, the annular base 230 has an inner diameter ID ranging from about 15 cm to about 30 cm, and an inner diameter ID ranging from about 19 cm to about 21 cm in other embodiments. In some embodiments, the annular base 230 has an outer diameter OD ranging from about 24 cm to about 35 cm, and an outer diameter OD ranging from about 26 cm to about 32 cm in other embodiments. In some embodiments, a ratio of the outer diameter to the inner diameter (OD/ID) ranges from about 1.2 to about 2.3, and in other embodiments OD/ID ranges from about 1.3 to about 1.7.

In some embodiments, a height T1 of the vertically extending member 220 from the annular base 230 to the uppermost surface 220*a* ranges from about 15 cm to about 35 cm. In other embodiments, the height T1 ranges from about 20 cm to about 30 cm. In some embodiments, the height T1 is substantially the same for each vertically extending member 220 disposed on an annular base 230.

The vertically extending members 220 have a shelf 225 extending in a radial direction away from a center of the annular base 230. In some embodiments, the distance T2 from the top surface 225*a* of the shelf to the uppermost surface 220*a* of the vertically extending member 220 ranges from about 2 cm to about 8 cm. In other embodiments, the distance T2 ranges from about 3.5 cm to about 4.5 cm. In some embodiments, a length T3 of the shelf 225 along the radial direction from the center of the support 55*b* from a vertical portion of the vertically extending member 220 to an end of the shelf 225 ranges from about 3 cm to about 12 cm. In other embodiments, the length T3 ranges from about 4 cm to about 10 cm. In some embodiments, the length T3 is substantially the same for each shelf 225 on each vertically extending member 220 disposed on an annular base 230.

In some embodiments, the width of the top portion of the vertically extending member 220 is chamfered 220*b*, as shown in FIG. 8B.

In some embodiments, a width T4 of the vertically extending member at an upper portion above the shelf 225 ranges from about 2 to about 12 cm. In other embodiments, T4 ranges from about 4 cm to about 10 cm. In some embodiments, a width T5 of the vertically extending member at the annular base 230 ranges from about 4 to about 15 cm. In other embodiments, T5 ranges from about 5 cm to about 13 cm.

In some embodiments, a height T6 between the annular base 230 and the junction of the vertical side portion of the vertically extending member 220 and the angled underside 225*b* of the shelf 225 ranges from between 7 cm to about 13 cm. In other embodiments, T6 ranges from about 9.5 cm to about 10.5 cm. In some embodiments, a length T7 of the angled underside 225*b* of the shelf 225 ranges from about 6 cm to about 10 cm. In other embodiments, T7 ranges from about 7.5 cm to about 8.5 cm. In some embodiments, the length T8 of a vertical face 225*c* of the end of the shelf ranges from about 0.2 cm to about 1 cm. In other embodiments, T8 ranges from about 0.4 cm to about 0.6 cm. In some embodiments, an angle α formed by the underside 225*b* of the shelf and a horizontal line ranges from about 20° to about 70°. In other embodiments, the angle α ranges from about 30° to about 60°.

In some embodiments, at dimensions of the end cap support 55*b* smaller than those disclosed, the end cap support 55*b* is not big enough or the end cap support 55*b* is not robust enough to support the end cap 35. In addition, at dimensions of the end cap support 55*b* smaller than those disclosed, there may not be sufficient clearance at the bottom of the end cap 35 to attach the internal cleaning fluid line 60 to the end cap projection 35. At dimensions smaller or larger than the disclosed dimensions, the end cap 30 may not fit or sit properly on the end cap support 55*b*. Also, at dimensions smaller than the disclosed dimensions, the end cap support 55*b* may not have sufficient structural integrity to support the end cap 30. In addition, at dimensions larger than the disclosed dimensions, the end cap support 55*b* may be unnecessarily large, the cost of producing the end cap support 55*b* may be unnecessarily increased.

In some embodiments, a ratio T2/T1 of the distance T2 from a top surface 225*a* of the shelf to an uppermost surface 220*a* of the vertically extending member to the distance T1 from a top surface of the annular base to the uppermost surface 220*a* of the vertically extending member ranges from about 0.05 to about 0.5. In other embodiments, the ratio T2/T1 ranges from about 0.1 to about 0.3. In some embodiments, a ratio T3/T1 of a length T3 of the shelf 225 extending in the radial direction to the distance T1 from the top of the annular base 230 to the uppermost surface 220*a* of the vertically extending member ranges from about 0.05 to about 0.8. In other embodiments, the ratio T3/T1 ranges from about 0.1 to about 0.5. In some embodiments, a ratio T3/T2 of a length T3 of the shelf 225 extending in the radial direction to the distance T2 from the top surface 225*a* of the shelf to an uppermost surface 220*a* of the vertically extending member ranges from about 0.4 to about 6. In other embodiments, the ratio T3/T2 ranges from about 0.8 to about 3.5. In some embodiments, a ratio T1/OD of the height T1 of the vertically extending member from a top surface of the annular base 230 to the uppermost surface 220*a* of the vertically extending member to an outer diameter OD of the annular base 230 ranges from about 0.4 to about 1.5. In other embodiments, the ratio T1/OD ranges from about 0.6 to about 1.2. In some embodiments, a ratio T5/T4 of a width T5 of the vertically extending member 220 at the annular base 230 to a width T4 at an upper portion above the shelf 225 of the vertically extending member ranges from about 1 to about 7.5. In other embodiments, the ratio T5/T4 ranges from about 1.3 to about 3.3. At ratios outside the disclosed ranges, the end cap 30 may not fit or sit properly on the end cap support 55*b*, the end cap support 55*b* may not have sufficient structural integrity to support the end cap 30, or the cost of producing the end cap support 55*b* may be unnecessarily increased.

Figure 9:
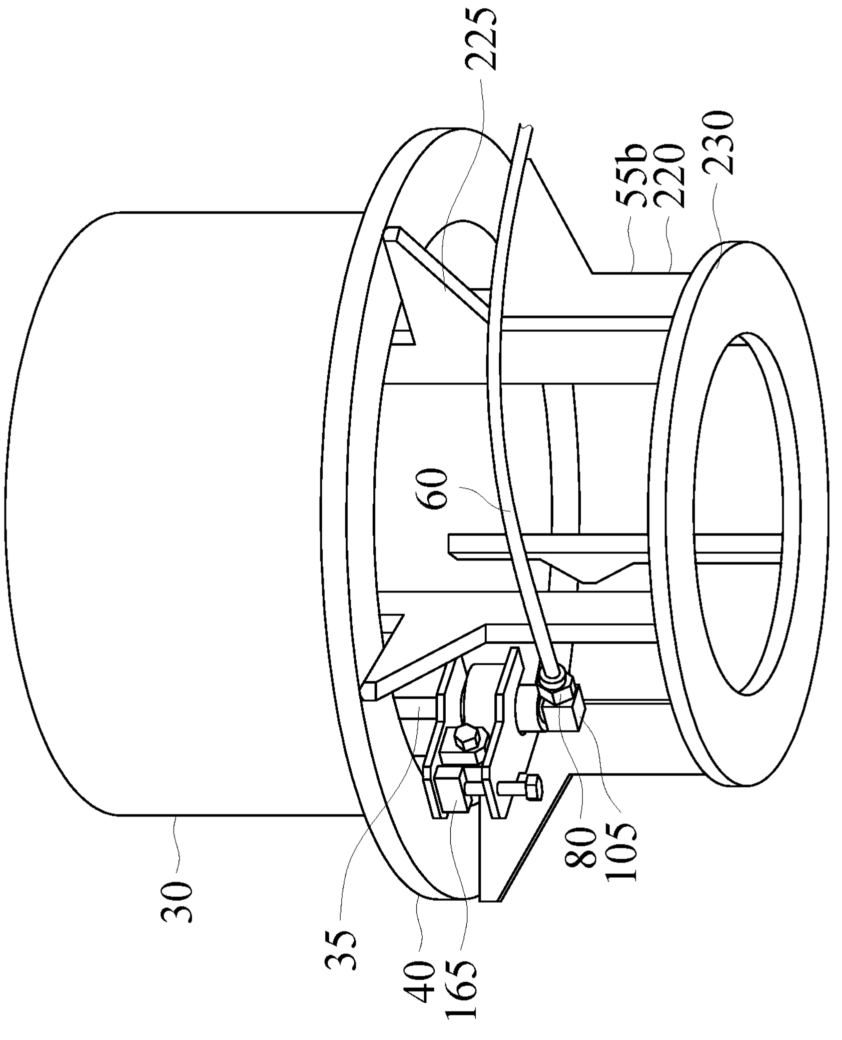
FIG. 9 is detailed view of a tube furnace end cap disposed on a support during a cleaning operation according to some embodiments of the disclosure.

FIG. 9 is detailed view of a tube furnace end cap 30 disposed on the end cap support 55*b* during a cleaning operation according to some embodiments of the disclosure. The connection of the internal cleaning fluid line 60 to the end cap projection 35 using the clamp 165 is shown.

Figure 10A:
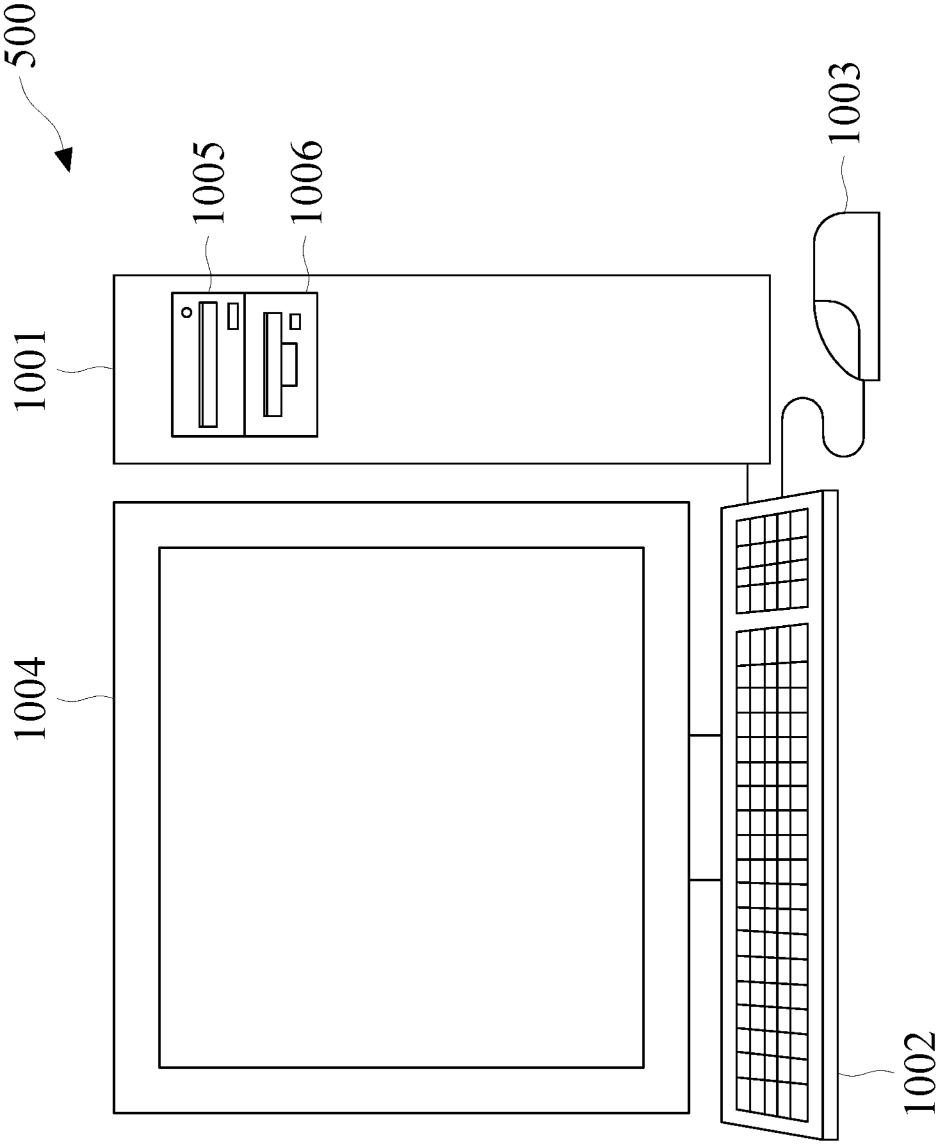
FIG. 10A and FIG. 10B are diagrams of a controller according to some embodiments of the disclosure.
Figure 10B:
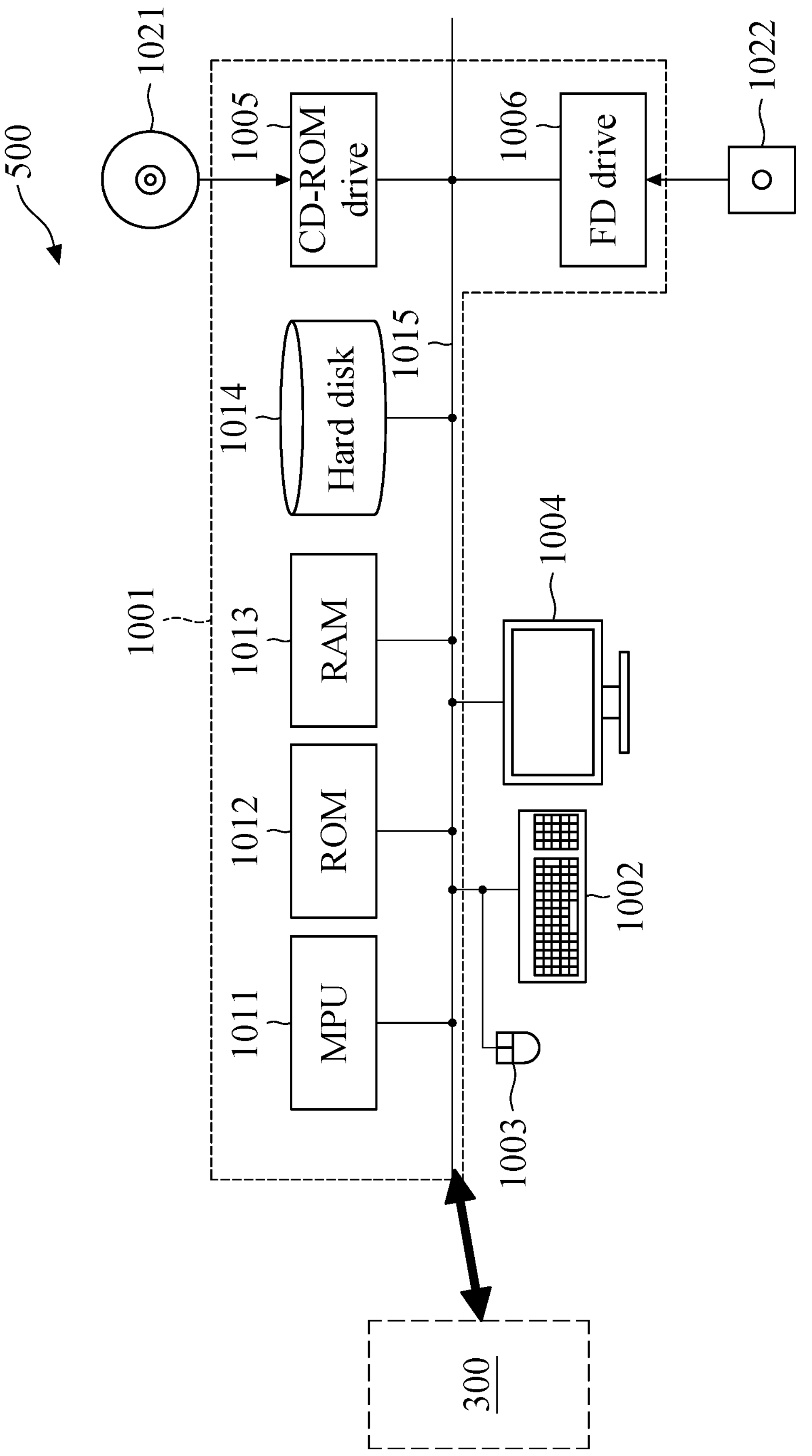

FIG. 10A and FIG. 10B are diagrams of a controller 500 according to some embodiments of the disclosure. In some embodiments, the controller 500 is a computer system. FIG. 10A and FIG. 10B illustrate a computer system 500 for controlling a cleaning apparatus 300 in accordance with various embodiments of the disclosure. FIG. 10A is a schematic view of the computer system 500 that controls the cleaning apparatus 300 of FIGS. 1-9. In some embodiments, the computer system 500 is programmed to monitor or control any or all of the flow of cleaning fluid or rinse fluid. The flow of the cleaning fluid or rinse fluid may be controlled by the controller 500 actuating valves (not shown) in the fluid flow lines. In some embodiments, the controller 500 monitors the temperature of the cleaning fluid and controls the heater 245. In some embodiments, the controller 500 controls the flow of the fluid draining through the outlet or drains 110, and monitors the level of recovered fluid in the recovery reservoir or tank 125.

As shown in FIG. 10A the computer system 500 is provided with a computer 1001 including an optical disk read only memory (e.g., CD-ROM or DVD-ROM) drive 1005 and a magnetic disk drive 1006, a keyboard 1002, a mouse 1003 (or other similar input device), and a monitor 1004 in some embodiments.

FIG. 10B is a diagram showing an internal configuration of the computer system 500. In FIG. 10B, the computer 1001 is provided with, in addition to the optical disk drive 1005 and the magnetic disk drive 1006, one or more processors 1011, such as a micro-processor unit (MPU) or a central processing unit (CPU); a read-only memory (ROM) 1012 in which a program, such as a boot up program is stored; a random access memory (RAM) 1013 that is connected to the processors 1011 and in which a command of an application program is temporarily stored, and a temporary electronic storage area is provided; a hard disk 1014 in which an application program, an operating system program, and data are stored; and a data communication bus 1015 that connects the processors 1011, the ROM 1012, and the like. Note that the computer 1001 may include a network card (not shown) for providing a connection to a computer network such as a local area network (LAN), wide area network (WAN) or any other useful computer network for communicating data used by the computer system 500 and the cleaning apparatus 300. In various embodiments, the controller 500 communicates via wireless or hardwired connection to the cleaning apparatus 300 and its components.

The programs for causing the computer system 500 to execute the method for controlling the cleaning apparatus and cleaning method are stored in an optical disk 1021 or a magnetic disk 1022, which is inserted into the optical disk drive 1005 or the magnetic disk drive 1006, and transmitted to the hard disk 1014. Alternatively, the programs are transmitted via a network (not shown) to the computer system 500 and stored in the hard disk 1014. At the time of execution, the programs are loaded into the RAM 1013. The programs are loaded from the optical disk 1021 or the magnetic disk 1022, or directly from a network in various embodiments.

The stored programs do not necessarily have to include, for example, an operating system (OS) or a third-party program to cause the computer 1001 to execute the methods disclosed herein. The program may only include a command portion to call an appropriate function (module) in a controlled mode and obtain desired results in some embodiments. In various embodiments described herein, the controller 500 is in communication with the cleaning apparatus 300 to control various functions thereof.

The controller 500 is coupled to the cleaning apparatus 300 in various embodiments. The controller 500 is configured to provide control data to those system components and receive process and/or status data from those system components. For example, in some embodiments, the controller 500 comprises a microprocessor, a memory (e.g., volatile or non-volatile memory), and a digital I/O port capable of generating control voltages sufficient to communicate and activate inputs to the processing system, as well as monitor outputs from the cleaning apparatus 300. In addition, a program stored in the memory is utilized to control the aforementioned components of the cleaning apparatus 300 according to a process recipe. Furthermore, the controller 500 is configured to analyze the process and/or status data, to compare the process and/or status data with target process and/or status data, and to use the comparison to change a process and/or control a system component. In addition, the controller 500 is configured to analyze the process and/or status data, to compare the process and/or status data with historical process and/or status data, and to use the comparison to predict, prevent, and/or declare a fault or alarm.

As set forth above, the executed program causes the processor or computer 500 to monitor or control any or all of the flow of cleaning fluid or rinse fluid, actuate valves, monitor the temperature of the cleaning fluid, control the heater 245, control the flow of the fluid draining through the outlet or drains 110, and monitor the level of recovered fluid in the recovery reservoir or tank 125.

Figure 11:
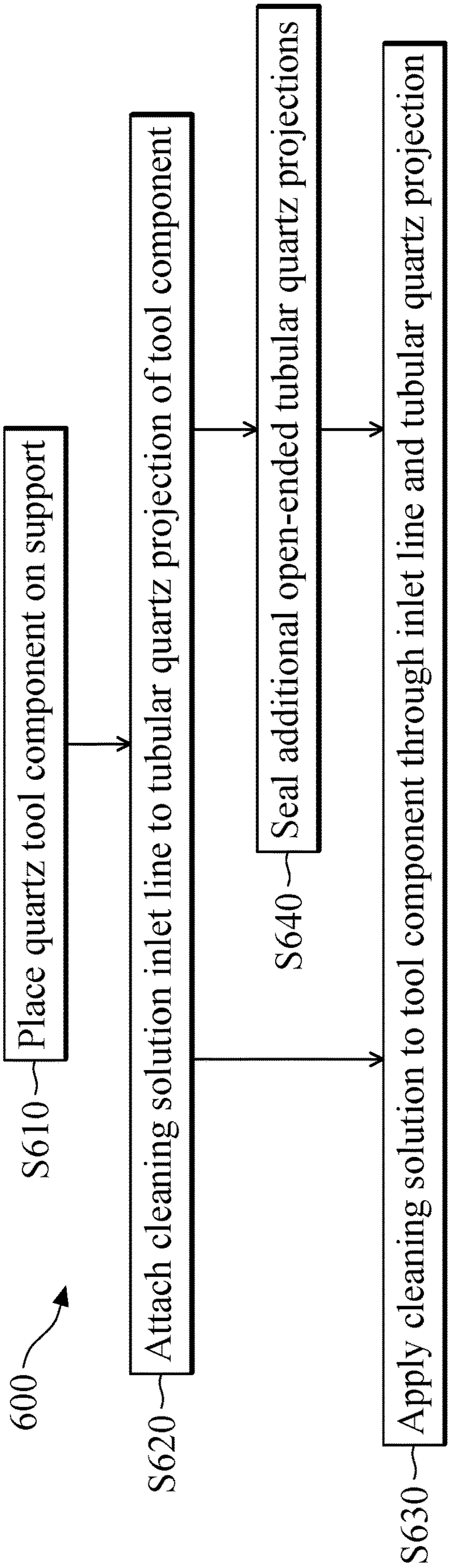
FIG. 11 shows a flowchart of a cleaning method according to some embodiments of the disclosure.

FIG. 11 shows a flowchart of a cleaning method 600 according to some embodiments of the disclosure. In some embodiments, a semiconductor device manufacturing tool component 5, 30 made of quartz is placed on a support in operation 5610. Then a cleaning fluid inlet line 60 is attached to a first open-ended tubular quartz projection 10, 35 extending from an outer main surface of the tool component in operation 5620. A cleaning fluid is applied to the semiconductor device manufacturing tool component 5, 30 by introducing the cleaning fluid through the cleaning fluid inlet line and the tubular quartz projection 10, 35 in operation 5630. In some embodiments, one or more additional open-ended tubular quartz projections 15 are sealed in operation 5640 before applying the cleaning fluid in operation 5630. In some embodiments, the sealing includes attaching an end cap 200 to an outer end of the one or more additional open-ended tubular quartz projections 15.

Figure 13B:
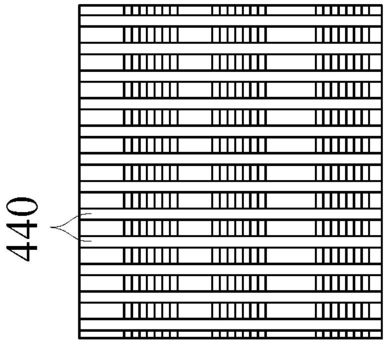
FIGS. 13A and 13B show a semiconductor device.
Figure 13A:
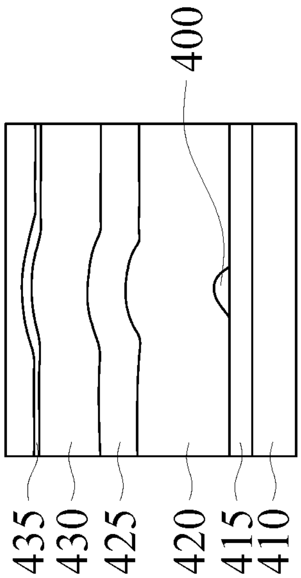
Figure 12:
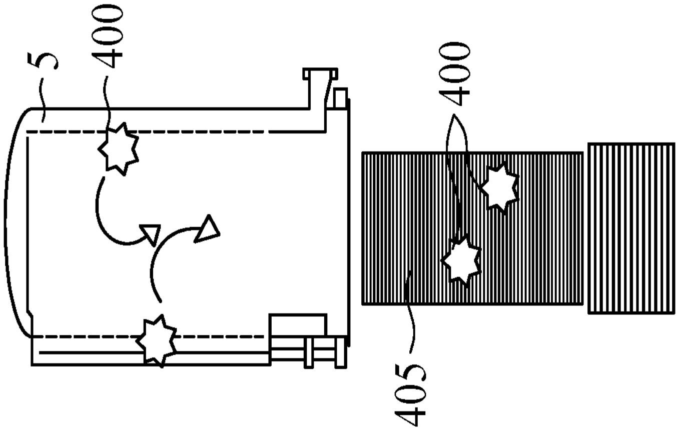
FIG. 12 shows a semiconductor device processing tool used during a semiconductor device manufacturing method.

Embodiments of the disclosure reduce defects of tetraethylorthosilicate (TEOS) layer formation. As shown in FIG. 12, contaminants 400 on a wall of a tube furnace 5 can fall off the wall during processing and contaminate the surface of wafers 405 being processed in the tube furnace 5. The contaminant 400 may form a bump thereby distorting subsequently formed layers, as shown in FIG. 13A. For example, a silicon nitride layer 415 may be formed over a polysilicon layer 410 disposed over a wafer 405 (not shown) in FIG. 13A. A silicon nitride particle 400 may fall off the tube furnace wall onto the silicon nitride layer 415. A subsequently formed TEOS layer 420 would have a bump over the contaminant particle 400. The bump would be replicated in subsequently formed layers over the TEOS layer 420, such as a second silicon nitride layer 425, a carbon-based bottom layer 430, and a second polysilicon layer 435. FIG. 13B is a plan view of the structure of FIG. 13A. As shown in FIG. 13B, the contaminant particle could distort subsequently formed polysilicon lines 440 and cause defects in the semiconductor device. Such defects can be prevented by cleaning the semiconductor device manufacturing tools according to embodiments of the disclosure.

Figure 14A:
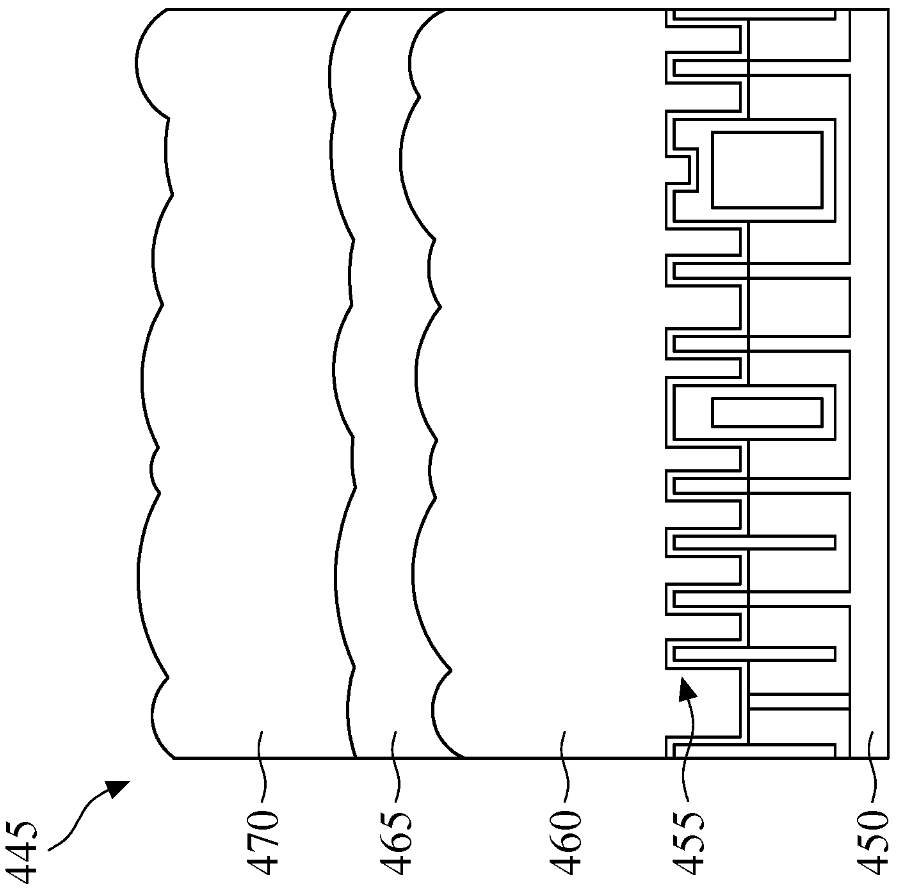
FIGS. 14A, 14B, 14C, 14D, 14E, 14F, and 14G illustrate a method of manufacturing a semiconductor device according to some embodiments of the disclosure.
Figure 14B:
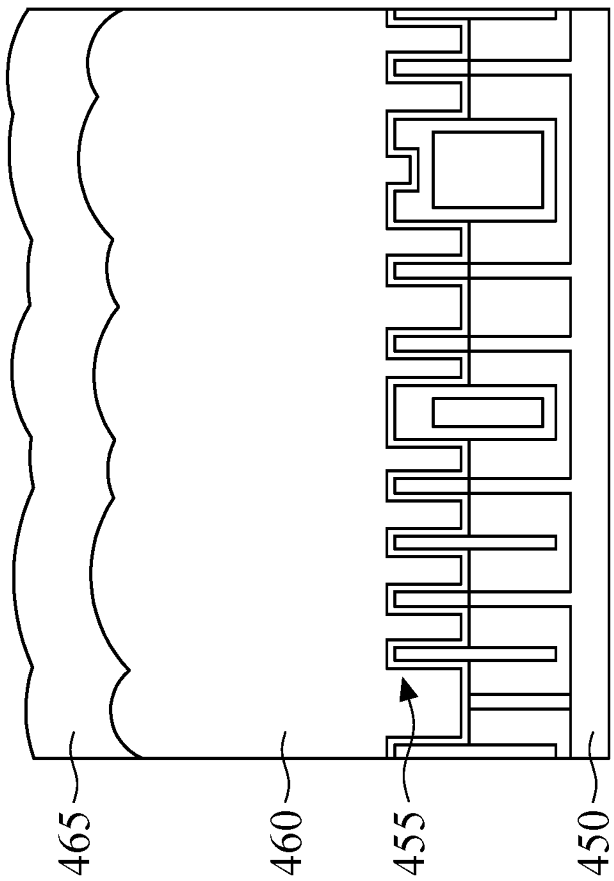
Figure 14C:
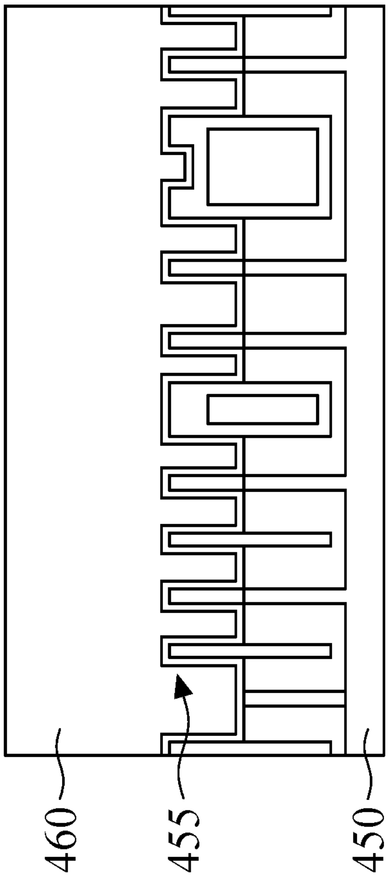

FIG. 14A illustrates a semiconductor device structure 445, which includes a semiconductor device components 455 disposed over a semiconductor substrate 450, such as a silicon wafer. A first polysilicon layer 460 is disposed over the semiconductor device components 455, and an etch stop layer 465, such as a silicon nitride layer 465 is disposed over the first polysilicon layer 460. A dummy polysilicon layer 470 is disposed over the etch stop layer 465 in some embodiments. The dummy polysilicon layer 470 and etch stop layers 465 are subsequently removed by chemical mechanical polishing (CMP), an etch back operation, or a combination thereof, as shown in FIGS. 14B and 14C to form a planarized first polysilicon layer 460.

Figure 14D:
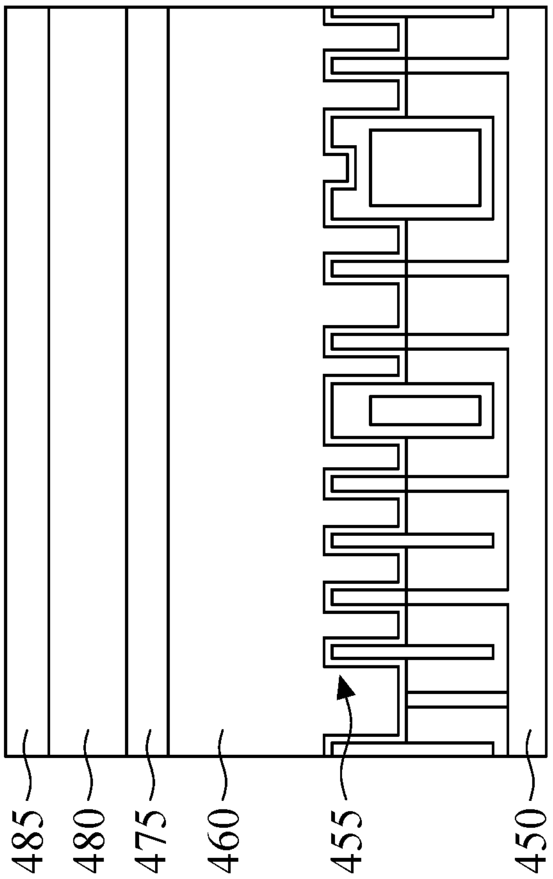

A lower silicon nitride layer 475 is subsequently formed over the planarized polysilicon layer, as shown in FIG. 14D. In some embodiments, the lower silicon nitride layer 475 is formed to a thickness of about 200 nm by ALD in a quartz tube furnace at about 500° C. Then, a TEOS layer 480 is formed over the lower silicon nitride layer 475. In some embodiments, the TEOS layer 480 is formed to a thickness of about 80 nm in the quartz tube furnace. A silicon nitride hard mask layer 485 is formed over the TEOS layer 480. In some embodiments, the silicon nitride hard mask layer 485 is formed to a thickness of about 35 nm in the quartz tube furnace at about 500° C. The quartz tube furnace components are cleaned according to the cleaning methods disclosed herein. In some embodiments, the quartz tube furnace components are cleaned according to a periodic cleaning schedule.

Figure 14E:
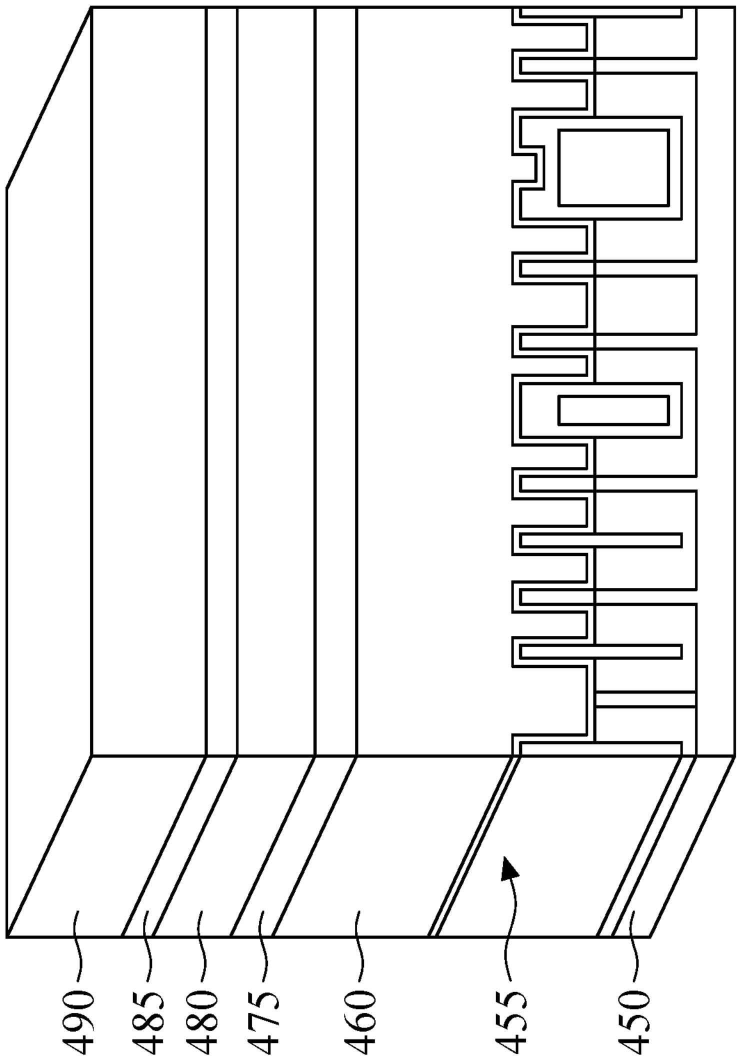
Figure 14F:
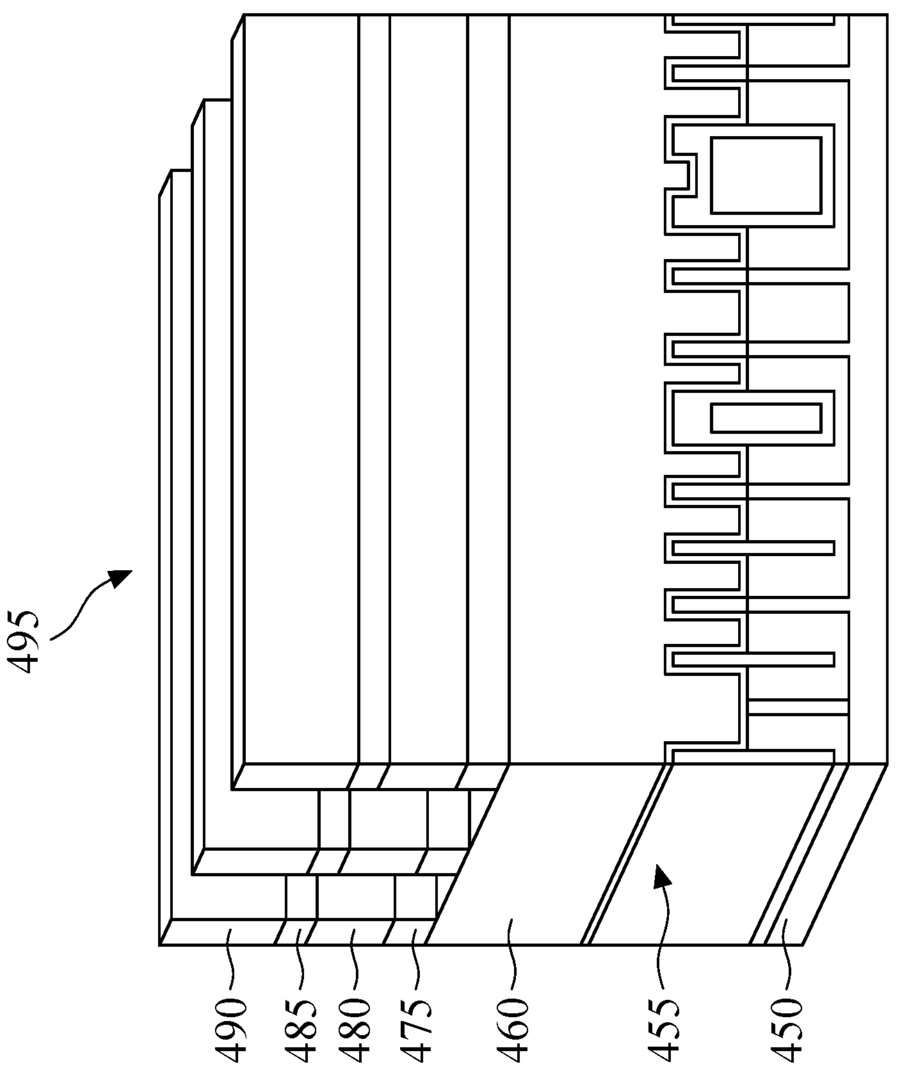
Figure 14G:
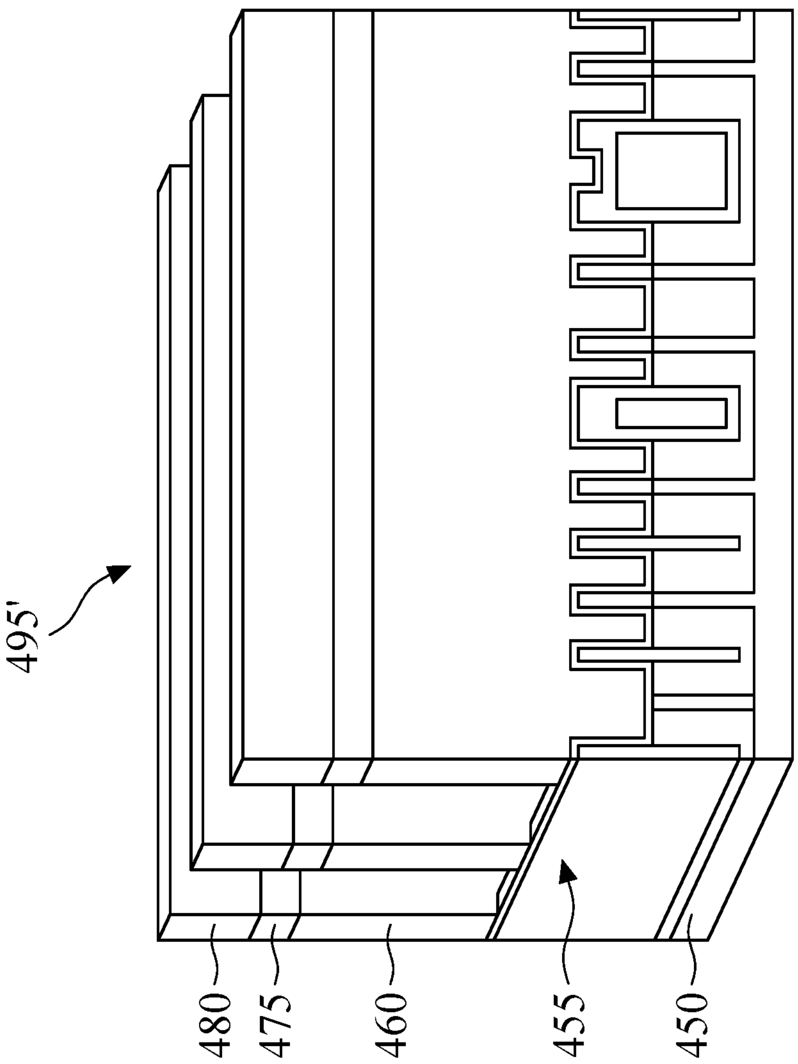

A carbon-based bottom layer 490 may be formed over the silicon nitride hard mask layer 485. In some embodiments, the carbon-based bottom layer 490 is formed by chemical vapor deposition (CVD) to a thickness of about 40 to 60 nm, as shown in FIG. 14E. The semiconductor device structure subsequently undergoes photolithographic patterning and etching operations to form a pattern 495 in the carbon-based bottom, hard mask, TEOS, and lower silicon nitride layers 490, 485, 480, 475, as shown in FIG. 14F. Using appropriate etching operations, the pattern 495 in the carbon-based bottom, hard mask, TEOS, and lower silicon nitride layers is extended into first polysilicon layer 460, to form a pattern 495' in the first polysilicon layer. The carbon-based bottom layer 490 and the silicon nitride hard mask layer 485 are removed by suitable etching or ashing techniques, as shown FIG. 14G. The TEOS layer 480 is substantially planar, uniform, and bump free, as shown in FIG. 14G. Periodic cleaning of the semiconductor device manufacturing tools, such as the quartz tube furnace, prevents the formation of contaminant particles, and thus prevents such particles from falling on the semiconductor device during processing, and prevents defects resulting from the contaminant particles falling on the semiconductor device.

Embodiments of the disclosure provide semiconductor devices with reduced defects and higher yields. Embodiments of the disclosure also provide improved uniformity of layers deposited in a quartz tube furnace. In addition, embodiments of the disclosure provide increased manufacturing economy. Tube furnace components can be cleaned and reused rather than replaced when they become contaminated by deposition process byproducts.

An embodiment of the disclosure is a method of cleaning, including placing a semiconductor device manufacturing tool component made of quartz on a support. A cleaning fluid inlet line is attached to a first open-ended tubular quartz projection extending from an outer main surface of the tool component. A cleaning fluid is applied to the semiconductor device manufacturing tool component by introducing the cleaning fluid through the cleaning fluid inlet line and the tubular quartz projection. In an embodiment, the semiconductor device manufacturing tool component includes one or more additional open-ended tubular quartz projections, and the method includes sealing the one or more additional open-ended tubular quartz projections before applying the cleaning fluid. In an embodiment, the sealing includes attaching an end cap to an outer end of the one or more additional open-ended tubular quartz projections. In an embodiment, the first open-ended tubular quartz projection includes a ground glass ball joint at an outer end. In an embodiment, the cleaning fluid inlet line is attached to the first open-ended tubular quartz projection using a clamp. In an embodiment, the clamp includes an opposing first and second Y-shaped plates with U-shaped openings on a first end along a length of the plates, a screw tightener attached to a second end of the first Y-shaped plate along the length of the plates, and a block attached to a second end of the second Y-shaped plate along the length of the plates opposing the screw tightener, wherein the first Y-shaped plate and the second Y-shaped plate pivot about a common axis between the first ends and second ends of the first Y-shaped plate and the second Y-shaped plate. In an embodiment, the semiconductor device manufacturing tool component is a tube portion of a quartz tube furnace, having an open end and a close end, and the first open-ended tubular quartz projection extends from the closed end. In an embodiment, the support includes an annular base and a plurality of vertically extending members arranged on the annular base, wherein each vertically extending member includes a horizontally extending shelf. In an embodiment, the semiconductor device manufacturing tool component is an end cap of a quartz tube furnace. In an embodiment, the first open-ended tubular quartz projection extends toward a base of the support.

Another embodiment of the disclosure is a support including an annular base and three or more vertically extending members arranged on the annular base. Each vertically extending member includes a shelf extending in a radial direction away from a center of the annular base. The vertically extending members are evenly arranged around the annular base. A ratio of a distance from a top surface of the shelf to an uppermost surface of the vertically extending member to a distance from a top surface of the annular base to the uppermost surface of the vertically extending member ranges from 0.05 to 0.5. A ratio of a length of the shelf extending in the radial direction to the distance from the top of the annular base to the uppermost surface of the vertically extending member ranges from 0.05 to 0.8. In an embodiment, a ratio of a length of the shelf extending in the radial direction to the distance from the top surface of the shelf to an uppermost surface of the vertically extending member ranges from 0.4 to 6. In an embodiment, a ratio of an outer diameter of the annular base to an inner diameter of the annular base ranges from 1.2 to 2.3. In an embodiment, a ratio of the distance from a top surface of the annular base to the uppermost surface of the vertically extending member to an outer diameter of the annular base ranges from 0.4 to 1.5. In an embodiment, a ratio of a width of the vertically extending member at the annular base to a width at an upper portion above the shelf of the vertically extending member ranges from 1 to 7.

Another embodiment of the disclosure is a cleaning apparatus including an enclosure and a support structure arranged inside the enclosure. The support structure includes an annular base and three or more vertically extending members arranged on the annular base. Each vertically extending member includes a shelf extending in a radial direction away from a center of the annular base. The vertically extending members are evenly arranged around the annular base. A ratio of a distance from a top surface of the shelf to an uppermost surface of the vertically extending member to a distance from a top surface of the annular base to the uppermost surface of the vertically extending member ranges from 0.05 to 0.5, and a ratio of a length of the shelf extending in the radial direction to the distance from the top surface of the annular base to the uppermost surface of the vertically extending member ranges from 0.05 to 0.8. A cleaning fluid inlet line is configured to attach to and provide cleaning fluid to a component to be cleaned in the cleaning apparatus. In an embodiment, the cleaning apparatus includes a cleaning fluid outlet line at a base of the enclosure. In an embodiment, the cleaning apparatus includes a cleaning fluid drain in a base of the enclosure. In an embodiment, the cleaning apparatus includes a ratio of an outer diameter of the annular base to an inner diameter of the annular base ranges from 1.2 to 2.3. In an embodiment, a ratio of the distance from a top surface of the annular base to the uppermost surface of the vertically extending member to an outer diameter of annular base ranges from 0.4 to 1.5.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of cleaning, comprising:

placing a semiconductor device manufacturing tool component made of quartz on a support, wherein the support comprises an annular base and a plurality of vertically extending members arranged on the annular base, wherein each vertically extending member includes a horizontally extending shelf;

attaching a cleaning fluid inlet line to a first open-ended tubular quartz projection extending from an outer main surface of the semiconductor device manufacturing tool component, wherein the first open-ended tubular quartz projection includes a ground glass ball joint at an outer end of the tubular quartz projection; and cleaning the semiconductor device manufacturing tool component by applying a cleaning fluid to the semiconductor device manufacturing tool component by introducing the cleaning fluid through the cleaning fluid inlet line and the first open-ended tubular quartz projection.

2. The method according to claim 1, wherein the semiconductor device manufacturing tool component comprises one or more additional open-ended tubular quartz projections, and the method further comprises sealing the one or more additional open-ended tubular quartz projections before applying the cleaning fluid.

3. The method according to claim 1, wherein the cleaning fluid inlet line is attached to the first open-ended tubular quartz projection using a clamp.

4. The method according to claim 1, wherein the semiconductor device manufacturing tool component is a tube portion of a quartz tube furnace, having an open end and a closed end, and the first open-ended tubular quartz projection extends from the closed end.

5. The method according to claim 1, wherein the semiconductor device manufacturing tool component is an end cap of a quartz tube furnace.

6. The method according to claim 1, wherein the first open-ended tubular quartz projection extends toward the annular base of the support.

7. The method according to claim 1, further comprising flushing the semiconductor device manufacturing tool component with deionized water after applying the cleaning fluid to the semiconductor device manufacturing tool component.

8. The method according to claim 2, wherein the sealing comprises attaching an end cap to an outer end of the one or more additional open-ended tubular quartz projections.

9. The method according to claim 3, wherein the clamp comprises opposing first and second Y-shaped plates with U-shaped openings on a first end along a length of the plates, a screw tightener attached to a second end of the first Y-shaped plate along the length of the plates, and a block attached to a second end of the second Y-shaped plate along the length of the plates opposing the screw tightener, wherein the first Y-shaped plate and the second Y-shaped plate pivot about a common axis between the first ends and second ends of the first Y-shaped plate and the second Y-shaped plate.

10. A method of cleaning a quartz tube furnace component, comprising:

placing the quartz tube furnace component on a support, wherein the support comprises an annular base and a plurality of vertically extending members arranged on the annular base, wherein each vertically extending member includes a horizontally extending shelf;

attaching a cleaning fluid inlet line having a bottom projection adapter to a tubular projection extending from quartz tube furnace component using a pivoting screw clamp, wherein the bottom projection adapter mates with the tubular projection; and cleaning the quartz tube furnace component by applying a cleaning fluid to the quartz tube furnace component by introducing the cleaning fluid through the cleaning fluid inlet line and the tubular projection.

11. The method according to claim 10, wherein the cleaning fluid is an HF aqueous solution.

12. The method according to claim 10, wherein the plurality of vertically extending members include at least three vertically extending members evenly arranged the annular base.

13. The method according to claim 11, further comprising rinsing the quartz tube furnace component with deionized water before applying the cleaning fluid to the quartz tube furnace component.

14. The method according to claim 13, further comprising flushing the quartz tube furnace component with deionized water after applying the cleaning fluid to the quartz tube furnace component.

15. A method of cleaning a quartz tube furnace component, comprising:

placing the quartz tube furnace component on a support structure arranged inside an enclosure, wherein the quartz tube furnace component has a quartz tubular projection extending from the quartz tube furnace component, wherein the support structure comprises:

an annular base and three or more vertically extending members arranged on the annular base, wherein:

each vertically extending member includes a shelf extending in a radial direction away from a center of the annular base, the vertically extending members are evenly arranged around the annular base, a ratio of a distance from a top surface of the shelf to an uppermost surface of the vertically extending member to a distance from a top surface of the annular base to the uppermost surface of the vertically extending member ranges from 0.05 to 0.5, and a ratio of a length of the shelf extending in the radial direction to the distance from the top surface of the annular base to the uppermost surface of the vertically extending member ranges from 0.05 to 0.8;

attaching a cleaning fluid inlet line to the quartz tubular projection wherein the cleaning fluid inlet line mates with the quartz tubular projection; and cleaning the quartz tube furnace component by applying a cleaning fluid to the quartz tube furnace component by introducing the cleaning fluid through the cleaning fluid inlet line and the quartz tubular projection.

16. The method according to claim 15, wherein the cleaning fluid inlet line is attached the quartz tubular projection by attaching a pivoting screw clamp to the cleaning fluid inlet line and the quartz tubular projection and tightening the pivoting screw clamp.

17. The method according to claim 15, wherein the cleaning fluid inlet line includes an adapter at an end of the cleaning fluid inlet line configured to mate with an end of the quartz tubular projection.

18. The method according to claim 15, further comprising rinsing the quartz tube furnace component with deionized water before applying the cleaning fluid.

19. The method according to claim 16, wherein the pivoting screw clamp comprises opposing first and second Y-shaped plates with U-shaped openings on a first end along a length of the plates, a screw tightener attached to a second end of the first Y-shaped plate along the length of the plates, and a block attached to a second end of the second Y-shaped plate along the length of the plates opposing the screw tightener, wherein the first Y-shaped plate and the second Y-shaped plate pivot about a common axis between the first ends and second ends of the first Y-shaped plate and the second Y-shaped plate.

* * * * *